(12) United States Patent
Chin et al.

(10) Patent No.: US 12,542,422 B2
(45) Date of Patent: Feb. 3, 2026

(54) OPTICAL TRANSMITTER

(71) Applicant: NTT, Inc., Tokyo (JP)

(72) Inventors: Meishin Chin, Musashino (JP);
Takahiko Shindo, Musashino (JP);
Shigeru Kanazawa, Musashino (JP)

(73) Assignee: NTT, Inc., Tokyo (JP)

( * ) Notice: Subject to any disclaimer, the term of this patent is extended or adjusted under 35 U.S.C. 154(b) by 968 days.

(21) Appl. No.: 17/762,217

(22) PCT Filed: Sep. 26, 2019

(86) PCT No.: PCT/JP2019/037957
§ 371 (c)(1),
(2) Date: Mar. 21, 2022

(87) PCT Pub. No.: WO2021/059448
PCT Pub. Date: Apr. 1, 2021

(65) Prior Publication Data
US 2022/0376474 A1 Nov. 24, 2022

(51) Int. Cl.
*H01S 3/00* (2006.01)
*H01S 5/026* (2006.01)
(Continued)

(52) U.S. Cl.
CPC .............. *H01S 5/12* (2013.01); *H01S 5/0265* (2013.01); *H01S 5/0601* (2013.01);
(Continued)

(58) Field of Classification Search
CPC ........ H01S 5/12; H01S 5/0265; H01S 5/0601; H01S 5/1014; H01S 5/34; H04B 10/501
See application file for complete search history.

(56) References Cited

U.S. PATENT DOCUMENTS

| 5,737,474 A | 4/1998 | Aoki et al. |
| 6,628,690 B1 * | 9/2003 | Fish .................... H04B 10/2914 372/50.1 |

(Continued)

FOREIGN PATENT DOCUMENTS

| JP | H08-116124 A | 5/1996 | |
| JP | H10308556 A * | 11/1998 | ............... H01S 5/10 |

(Continued)

OTHER PUBLICATIONS

W. Kobayashi, et al., *Novel Approach for Chirp and Output Power Compensation Applied to a 40-Gbit/s EADFB Laser Integrated with a Short SOA*, Apr. 2015, Opt. Express, vol. 23, No. 7, pp. 9533-9542.

(Continued)

*Primary Examiner* — Mark Hellner
(74) *Attorney, Agent, or Firm* — Workman Nydegger

(57) ABSTRACT

In the present disclosure, in an EADFB laser in which an SOA has been integrated, a new configuration in which deterioration of optical waveform quality is solved or mitigated while keeping characteristics that a manufacturing process can be simplified by using the same layer structure is indicated. In the optical transmitter of the present disclosure, a waveguide structure having a tapered structure in at least a part of the SOA waveguide is adopted. A width of the waveguide is changed to be reduced in an SOA region, and an amount of carrier consumption is made uniform in an optical waveguide direction. A waveguide width is continuously reduced in an optical waveguide direction in the SOA so that the optical confinement coefficient is reduced, and light power distributed in an active layer region is made constant.

8 Claims, 19 Drawing Sheets

(51) Int. Cl.
   *H01S 5/06* (2006.01)
   *H01S 5/10* (2021.01)
   *H01S 5/12* (2021.01)
   *H04B 10/50* (2013.01)
   *H01S 5/34* (2006.01)

(52) U.S. Cl.
   CPC ......... *H01S 5/1014* (2013.01); *H04B 10/501* (2013.01); *H01S 5/34* (2013.01)

(56) References Cited

U.S. PATENT DOCUMENTS

| | | | | |
|---|---|---|---|---|
| 2004/0062485 A1* | 4/2004 | Kelly | ................. | H01S 5/50 |
| | | | | 385/50 |
| 2005/0006654 A1* | 1/2005 | Kang | ................. | H01S 5/026 |
| | | | | 372/50.1 |

FOREIGN PATENT DOCUMENTS

| | | |
|---|---|---|
| JP | 2004-177728 A | 6/2004 |
| JP | 2018-074098 A | 5/2018 |
| JP | 2019-4093 A | 1/2019 |

OTHER PUBLICATIONS

Hongwei Zhao et al., *High-Power Indium Phosphide Photonic Integrated Circuits*, IEEE Journal of Selected Topics in Quantum Electronics, vol. 25, No. 6, Nov./Dec. 2019, pp. 1-10.

* cited by examiner

Fig. 11
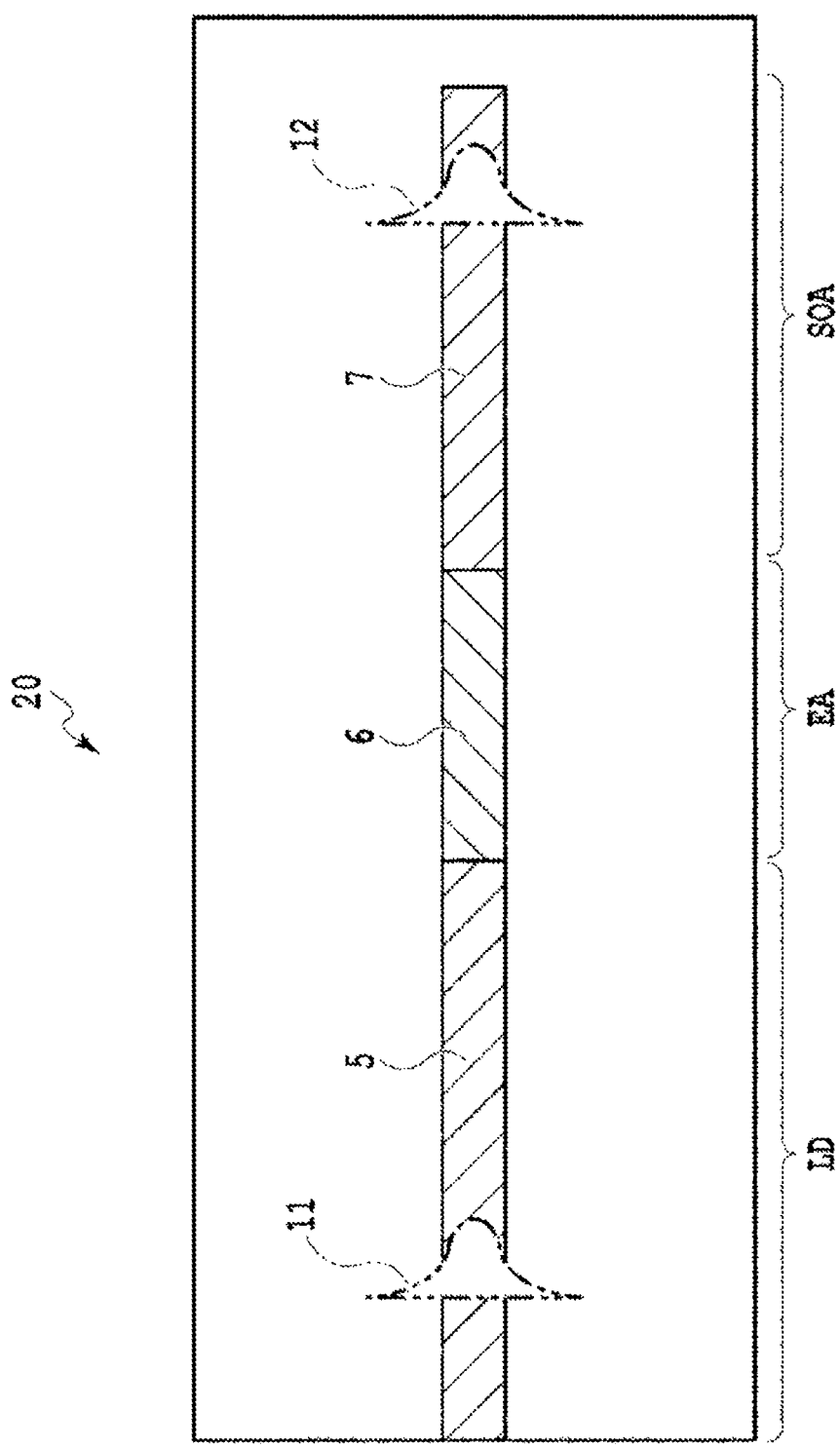
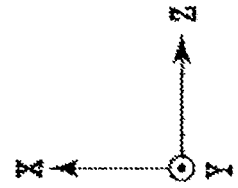

Fig. 13
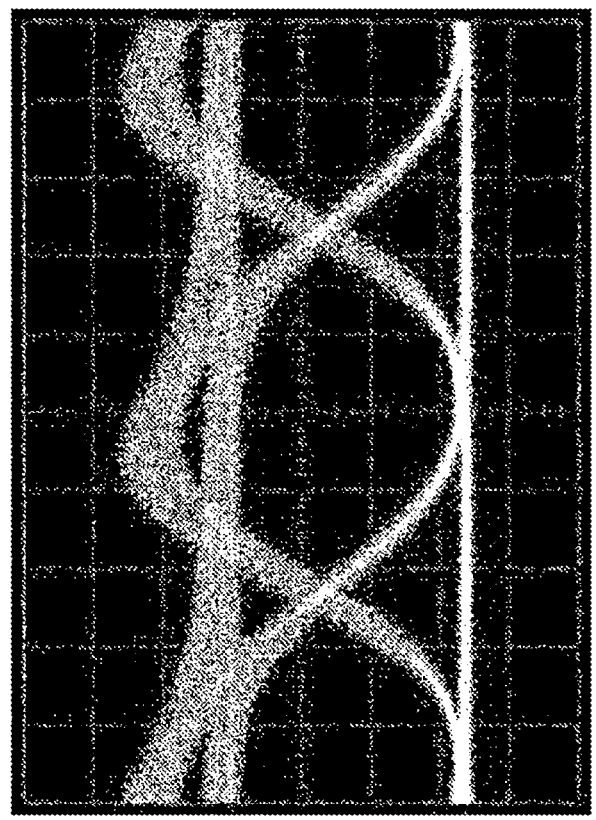
(b)
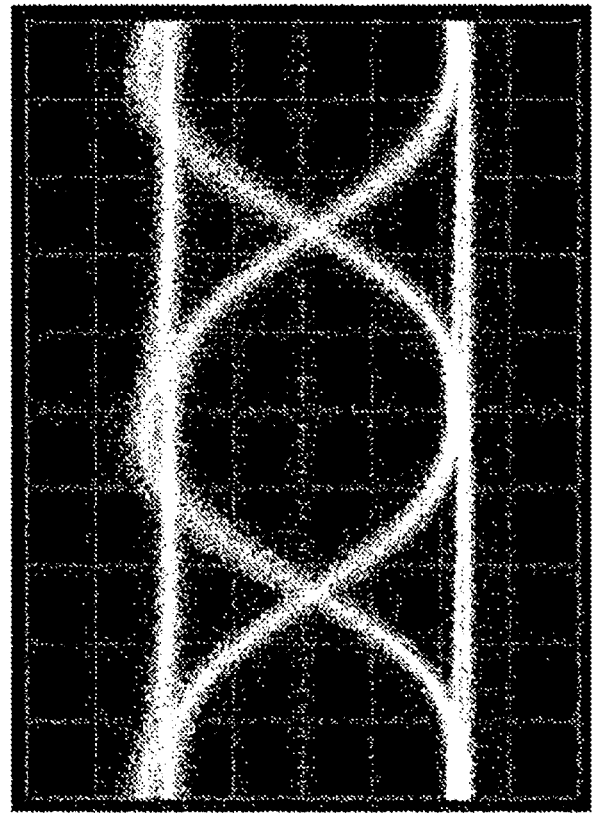
(a)

OPTICAL TRANSMITTER

TECHNICAL FIELD

The present invention relates to a semiconductor laser element. Examples of the semiconductor laser element include an optical transmitter including a modulator, a semiconductor optical amplifier, and a laser.

BACKGROUND ART

Hereinafter, a semiconductor laser element in which an electro-absorption (EA) optical modulator is integrated on a substrate is disclosed. Further, an optical transmitter including a distributed feedback (DFB) laser, an EA modulator, and a semiconductor optical amplifier (SOA) is also disclosed.

With the spread of video distribution services and the increase in mobile traffic demand in recent years, network traffic has increased explosively. In optical transmission lines responsible for networks, trends are to increase a transmission rate, reduce power consumption of optical transmission devices, and reduce a cost of the networks through extension of a transmission distance. Semiconductor modulation light sources used in optical transmission devices are also required to have high speed and high output while suppressing an increase in power consumption.

FIG. 1 is a diagram illustrating a schematic configuration of an EA modulator integrated DFB (EADFB) laser. The EADFB laser has a higher extinction property and a better chirp property than a direct modulation laser and has been used in a wide range of applications. As illustrated in FIG. 1 illustrating a cross section (Y-Z plane) of a substrate passing through an optical waveguide, the EADFB laser 10 has a structure in which a DFB laser 1 and an EA modulator 2 have been integrated on the same substrate. The DFB laser 1 includes an active layer 4 composed of a multi quantum well (MQW) and oscillates at a single wavelength determined by a driving current source 8 and a diffraction grating 5 formed in a resonator. Further, the EA modulator 2 includes a light absorption layer 6 including an MQW having a composition different from that of the DFB laser 1 and changes an amount of light absorption through control of an electrical signal source 9. Through driving under a condition that output light from the DFB laser 1 is transmitted or absorbed, the light is blinked and an electrical signal is converted into an optical signal.

Because the EADFB laser is accompanied by a large light loss in the EA modulator 6, it is difficult to achieve a high output. As a solution to this, an EADFB laser in which a semiconductor optical amplifier (SOA) has been further integrated with a light emission end of the EADFB laser (SOA assisted extended reach EADFB laser: AXEL) has been proposed (NPL 1). Hereinafter, for the sake of simplicity, a laser in which the SOA is further integrated with the EADFB laser is referred to as an AXEL.

FIG. 2 is a diagram illustrating a schematic configuration of an AXEL in which an SOA is integrated. In the AXEL 20 of FIG. 2, which illustrates a cross section (a Y-Z plane) of a substrate passing through an optical waveguide, as in FIG. 1, signal light modulated by an EA modulator 2 is amplified by an integrated SOA region 3, thereby improving optical output. In the configuration of the AXEL 20, a high output of about twice that of a general EADFB laser can be obtained. Further, when the AXEL 20 is driven under an operating condition in which the same optical output as that of the general EADFB laser can be obtained, power consumption can be reduced by about 40% because of a high efficiency operation due to an SOA integration effect. In the AXEL 20, the same MQW structure as the active layer 4 of the DFB laser 1 is used as an active layer 7 of an SOA 3. In the AXEL 20, a device can be made through the same process as in an EADFB laser of the related art without a need to add a regrowth process for integration of the SOA region.

CITATION LIST

Non Patent Literature

NPL 1: W. Kobayashi, et al., "Novel approach for chirp and output power compensation applied to a 40-Gbit/s EADFB laser integrated with a short SOA", April 2015, Opt. Express, Vol. 23, No. 7, pp. 9533-9542

SUMMARY OF THE INVENTION

Technical Problem

However, in an AXEL in which an SOA is monolithically integrated, the same manufacturing process as in an EADFB laser can be used, but there is a problem that a degree of freedom in designing a structure of the SOA is limited and optical waveform quality deteriorates as will be described below.

Means for Solving the Problem

One aspect of the present disclosure is an optical transmitter including, on a substrate, a distributed feedback (DFB) laser having an active region with a multi quantum well, an electro-absorption (EA) modulator configured to modulate oscillation light of the DFB laser, and a semiconductor optical amplifier (SOA) having an active region with an identical composition as the active region of the DFB laser and configured to amplify signal light from the EA modulator, in which a tapered structure where a width of a waveguide in a cross section perpendicular to an optical waveguide direction is gradually reduced along the optical waveguide direction is included in at least a part of the waveguide of the SOA.

The waveguide width of the SOA is changed in various aspects along the optical waveguide direction. An entire region of the SOA may have a tapered structure, or the tapered structure may be included in an intermediate portion of the SOA in the optical waveguide direction and a portion between an incidence end of the SOA and an end of the tapered structure proximate to the incidence end and a portion between an emission end of the SOA and an end of the tapered structure proximate to the emission end may each be constant-width waveguides. The tapered structure may be included in a portion including the emission end of the SOA, and a portion between an end of the tapered structure proximate to the EA modulator and an end of the SOA facing the EA modulator may be a constant-width waveguide.

Effects of the Invention

The optical transmitter of the present disclosure solves and mitigates a problem of deterioration of optical waveform quality.

BRIEF DESCRIPTION OF DRAWINGS

FIG. 11 is a diagram illustrating a configuration of an optical transmitter of the related art used for comparison with Example 1.

FIG. 13 is a diagram illustrating improvement of an eye pattern in the optical transmitter of Example 1.

DESCRIPTION OF EMBODIMENTS

In the present disclosure, in an EADFB laser in which an SOA has been integrated (hereinafter also referred to as an AXEL), a new configuration in which a problem of deterioration of optical waveform quality is solved or mitigated while keeping a characteristic that a manufacturing process can be simplified by using the same layer structure for a DFB laser and an SOA is indicated. The EADFB laser in which the SOA has been integrated can be used as an optical transmitter. Further, the present disclosure includes an aspect as an optical transmission device including an optical transmitter. Hereinafter, a characteristic operation of the present disclosure as an optical transmitter will be described, but this can also be used in various forms of devices that transmit signal light carrying information. Further, hereinafter, an AXEL and an optical transmitter are substantially synonymous and will be described interchangeably.

Figure 1:
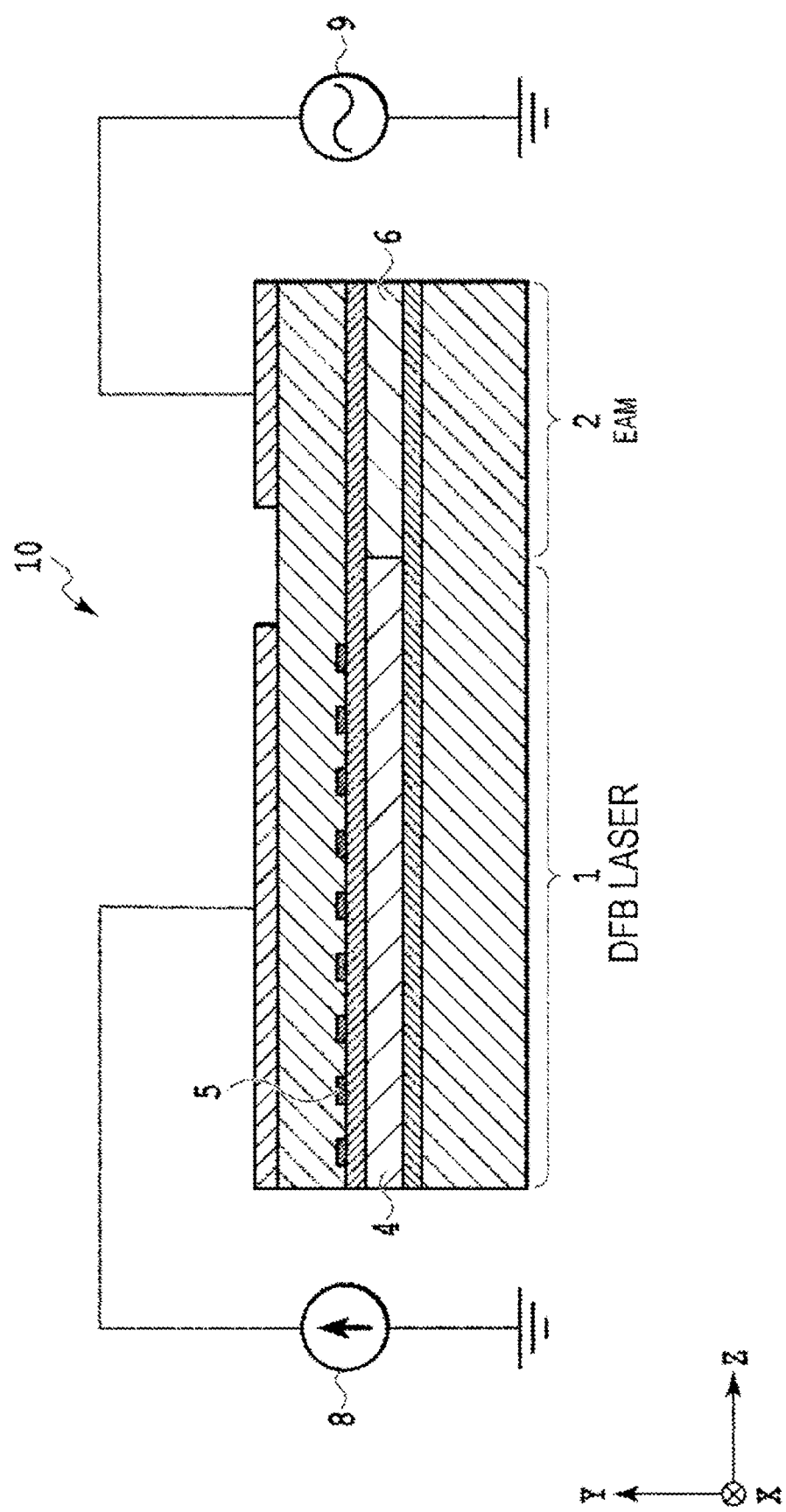
FIG. 1 is a diagram illustrating a schematic configuration of an EA modulator integrated DFB laser.
Figure 2:
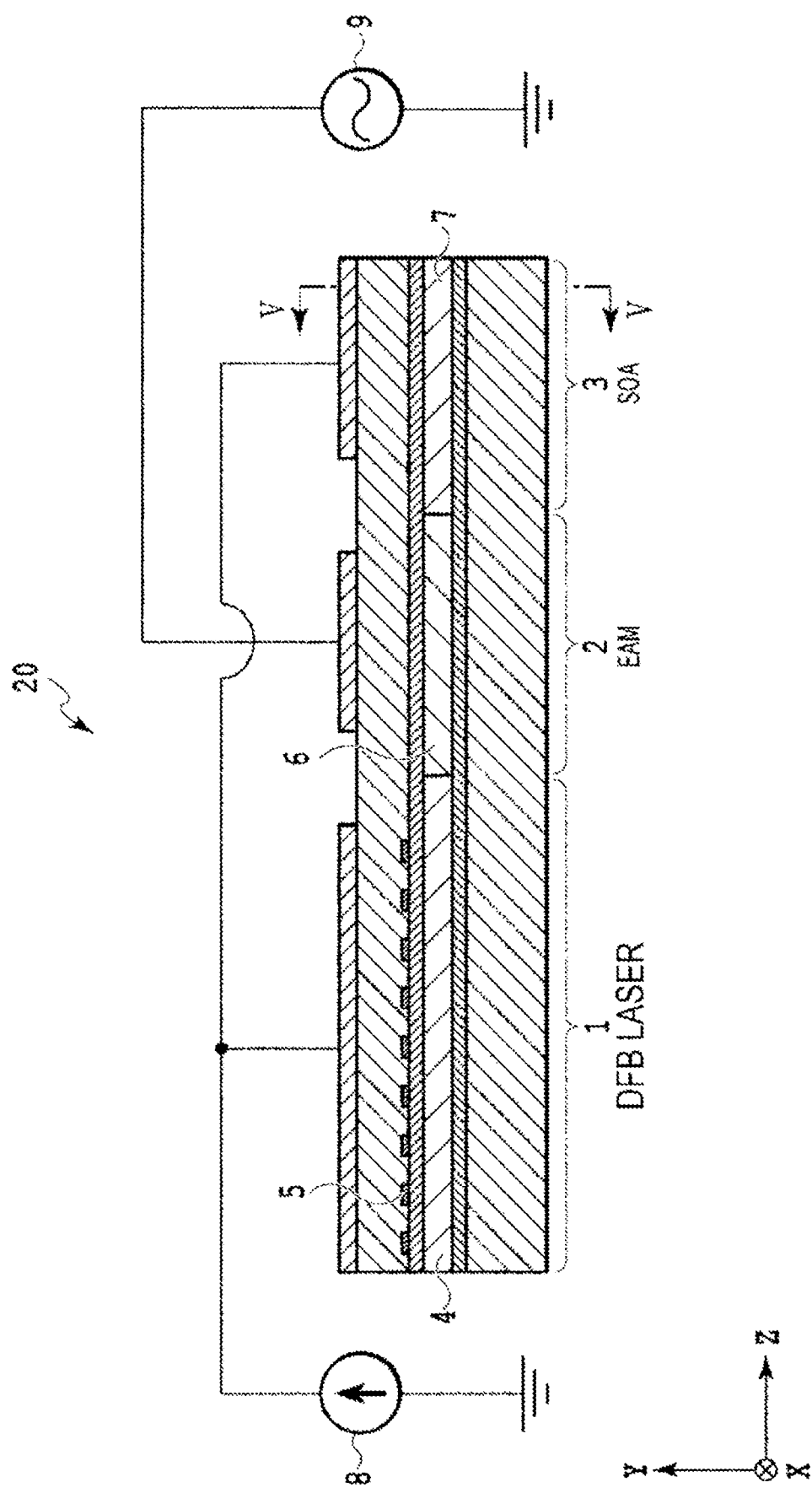
FIG. 2 is a diagram illustrating a schematic configuration of an AXEL in which an SOA is further integrated.

As a problem due to constraints of a layer structure of the SOA of the AXEL, there is the deterioration of optical signal waveform quality in the SOA due to the pattern effect. The pattern effect is known as a phenomenon in which distortion of a waveform changes depending on a configuration of a pulse train to be transmitted. As illustrated in FIG. 2, in the AXEL 20, the output light from the DFB laser 1 is modulated by the EA modulator 2, and then incident on and amplified by the SOA 3. The incident light on the SOA 3 is modulated and is signal light of which intensity changes with time. Inside the SOA 3, a carrier generated by current injection is consumed by optical amplification. When the signal light is incident on the SOA 3, the light intensity of the signal light constantly fluctuates, and thus an amount of carrier consumption in the SOA 3 also fluctuates with the light intensity. For example, when the light intensity of the incident signal light continues to be strong, carriers inside the SOA tend to be almost exhausted, and conversely, when the light intensity of the signal light continues to be weak, the internal carriers are not consumed and a carrier density increases. Thus, an optical gain of the SOA also fluctuates due to a temporal state change of the intensity of the signal light, which adversely affects the optical waveform quality. As will be described next, an influence of the pattern effect is strongly generated on the optical waveform, especially when the same sign continues.

When light is subjected to intensity modulation (on-off-keying (OOK)) using a non-return-to-zero (NRZ) signal scheme, a state in which light intensity is strong is called a "1" level, a state in which the light intensity is weak is called a "0" level, and a behavior of the SOA when the same sign continues is considered. When bits at a "0" level continue, the light intensity of the signal light incident on the SOA continues to be weak and the amount of carrier consumption inside the SOA continues to be low, such that the carrier density is kept high. When the signal light changes to a "1" level after the signal light at a "0" level continues, the situation changes and the carriers accumulated in the SOA are consumed at once. In this case, the subsequent signal at "1" level is strongly amplified, and it is easy for the optical signal waveform to greatly overshoot.

On the other hand, when signal light in which bits at a "1" level continue is incident on the SOA, the light intensity of the signal light is always kept strong, many carriers are consumed for optical amplification, and the optical gain of the SOA decreases. As a result, the "1" level of the optical signal waveform decreases and the quality of the optical signal waveform deteriorates. A pattern effect in such an SOA is particularly remarkable when the carrier density in the SOA is low. For the same reason, a strong influence of the pattern effect appears even when an SOA length is long. Further, because a substantial time when the same sign continues becomes long when a bit rate of a modulation signal is low, it is particularly easy for an influence of the pattern effect to appear.

Figure 3:
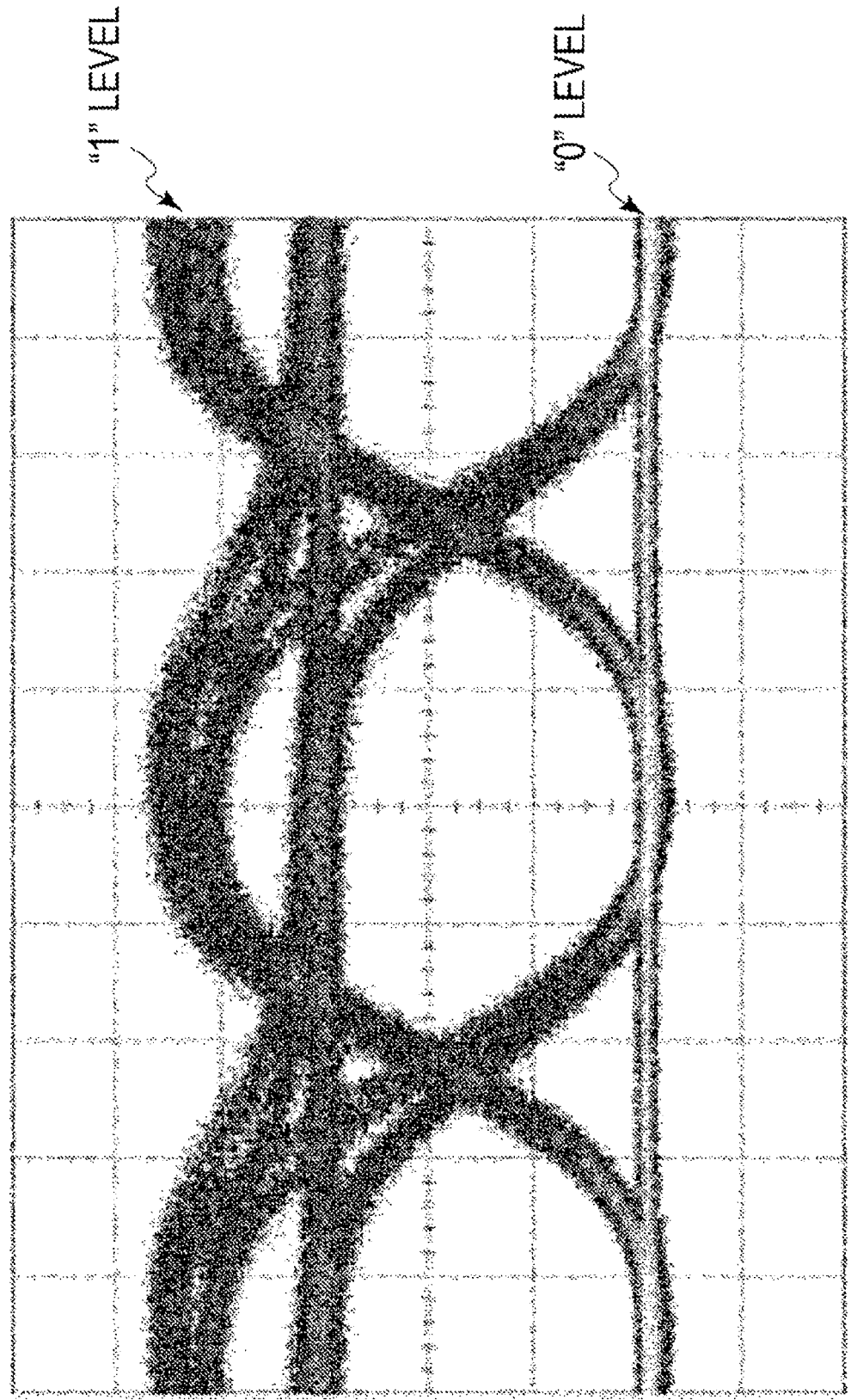
FIG. 3 is a diagram illustrating an NRZ optical waveform when a pattern effect occurs in the SOA.

FIG. 3 is a diagram illustrating an NRZ optical waveform when the pattern effect occurs in the SOA. In the AXEL 20 illustrated in FIG. 2, a 10 Gbit/s NRZ optical waveform (eye pattern) when the pattern effect occurs is illustrated. As described above, at a "0" level at which the carrier density is kept high is stable at a substantially uniform level. On the other hand, it can be seen that at a "1" level at which carriers are consumed becomes unstable due to a change in the carrier density inside the SOA depending on a state of an input signal, and a level of an optical signal intensity also varies. Deterioration of optical waveform quality as illustrated in FIG. 3 leads to deterioration of transmission quality, which causes an inability to transmit an optical signal over a sufficient distance. In order to suppress the pattern effect, it is necessary to increase the carrier density inside the SOA. However, as described above, the SOA 3 of the AXEL 20 is limited to an active layer (MQW) having the same layer structure as the DFB laser 1. It is difficult to adjust the carrier density inside the SOA, and the suppression of the pattern effect is difficult as well. In an AXEL of the related art, an optical confinement coefficient and a current density of the DFB laser and the SOA cannot be set separately due to constraints of the layer structure of the SOA.

In particular, when the SOA region is long, the influence of the pattern effect becomes large, and even when a sufficient SOA current is injected, the deterioration of the optical waveform quality cannot be sufficiently suppressed. Specifically, when an NRZ signal having a bit rate of about 10 Gbit/s is input to the SOA and the SOA length becomes 200 μm or more, a sufficient suppressing effect cannot be obtained even when an amount of SOA current is increased.

In the AXEL of the present disclosure, a waveguide structure (tapered structure) in which a volume per unit length of the SOA is gradually or continuously reduced along an optical waveguide direction while using the same layer structure for the DFB laser and the SOA is adopted. With this waveguide structure of the SOA, a problem of waveform deterioration due to the pattern effect in the related art is solved and mitigated. The waveguide structure of the DFB laser and the SOA is manufactured using a batch process. Thus, in the AXEL of the present disclosure, no change is required for a process of manufacturing the AXEL of the related art, and the waveguide structure in the SOA of the present disclosure can be achieved by simply modifying a mask pattern at the time of forming the waveguide of the SOA.

The suppression of the pattern effect in the optical transmitter of the present disclosure will be described below. As described above, it is desirable to increase the carrier density in the waveguide as a method of suppressing the pattern effect generated in the SOA. However, simply increasing the carrier density of the entire SOA is not sufficient to suppress the pattern effect. The inventors have focused on the change in carrier density in the optical waveguide direction in the SOA region, and have found a mechanism for more effectively suppressing the pattern effect.

Consumption of carriers due to optical amplification inside the SOA is not uniform, and the amount of carrier consumption is larger in a region in which light power inside the SOA is strong. Here, when light propagates inside an SOA including an active layer having an optical gain g, light power P after the light propagates over a length L is expressed by the following equation.

$$P = P_0 \exp\{(\Gamma g - \alpha)L\} \quad \text{Equation (1)}$$

In Equation (1), $P_0$ is the light power at the time of incidence on the SOA, $\Gamma$ is an optical confinement coefficient in the active layer having an optical gain, and $\alpha$ is a loss at the time of propagation. That is, when $(\Gamma g - \alpha) > 0$ is satisfied, the SOA has an amplification effect, and a net optical gain $(\Gamma g - \alpha)$ acts according to a propagation length L to amplify the light.

Figure 4:
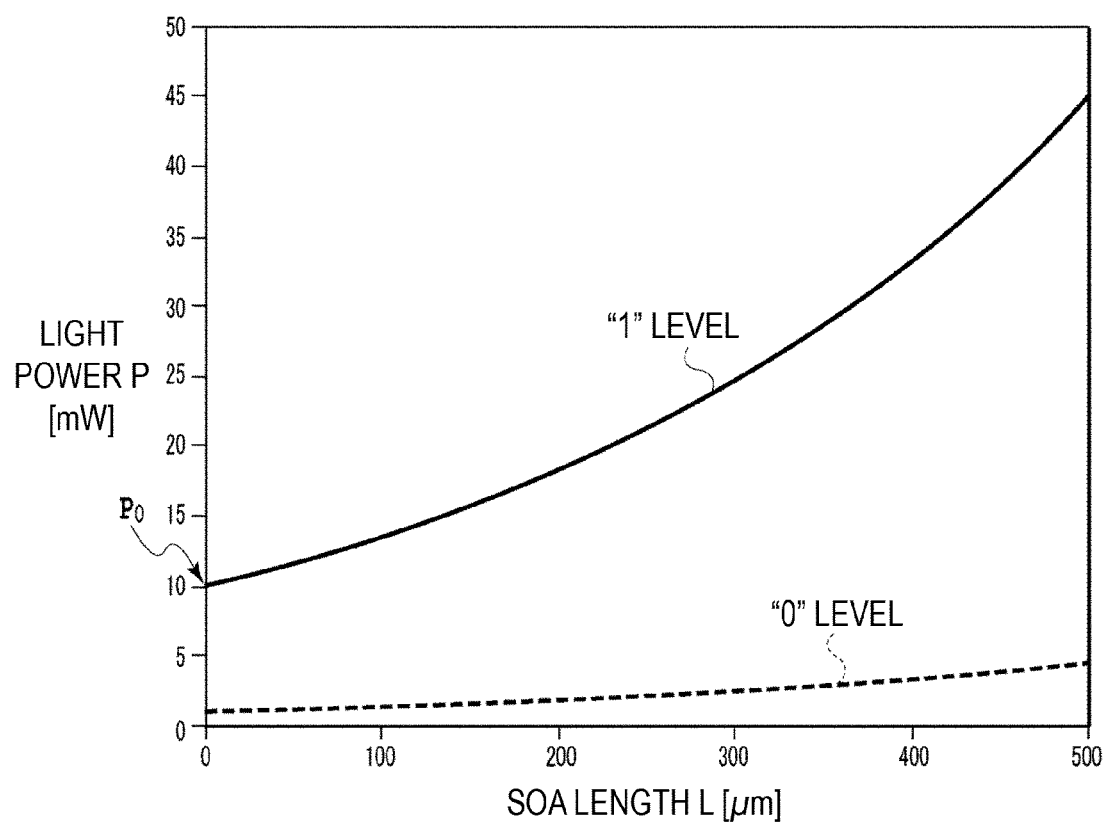
FIG. 4 is a diagram illustrating an example of calculation of a change in light power in an optical waveguide direction inside the SOA.

FIG. 4 is a diagram illustrating an example of calculation of a light power change in the optical waveguide direction inside the SOA. A horizontal axis in FIG. 4 indicates an SOA length L from a starting point of the SOA region proximate to the EA modulator, that is, a propagation distance (μm) of the light, and a vertical axis indicates the light power P (mW). Thus, FIG. 4 illustrates a state in which light propagating inside the SOA is amplified according to an optical gain shown in Equation (1), and the light power gradually increases. Here, a "1" level and a "0" level are assumed as incident light power $P_0$ and are calculated in the case of 10 mW and 1 mW, respectively. It can be seen that the light power increases with the SOA length L, which is a propagation distance inside the SOA, and the longer the propagation distance, the more the light power literally increases exponentially.

As illustrated in FIG. 4, in the SOA, the light power is low near the light incidence end and is stronger in a portion (L is large) farther toward the emission end from the incidence end. Thus, the amount of carrier consumption per unit length of the SOA also increases exponentially from the incidence end to the emission end, like the light power. Based on this point, even when an injection current to the SOA is simply increased, it is difficult to achieve an optimum carrier density over the entire inside of the SOA because the amount of carrier consumption spatially differs inside the SOA. It has been difficult to effectively suppress the deterioration of the pattern effect and the optical waveform quality by simply increasing the SOA current.

In the optical transmitter of the present disclosure, the volume per unit length of the SOA region is gradually or continuously reduced in the optical waveguide direction in order to make the carrier density in the SOA uniform depending on the light power inside the SOA and the amount of carrier consumption. As is clear from a calculation result of the light power in FIG. 4, the light power inside the SOA in the AXEL of the related art increases exponentially according to the propagation distance from the incidence end of the SOA region, and similarly, the amount of carrier consumption also increases. This amount of carrier consumption is proportional to the number of photons present per unit volume, that is, a photon density. The photon density is obtained by dividing the light power in the active region by a waveguide cross-sectional area of the active region. Here, a waveguide configuration in the SOA region will be further examined.

Figure 5:
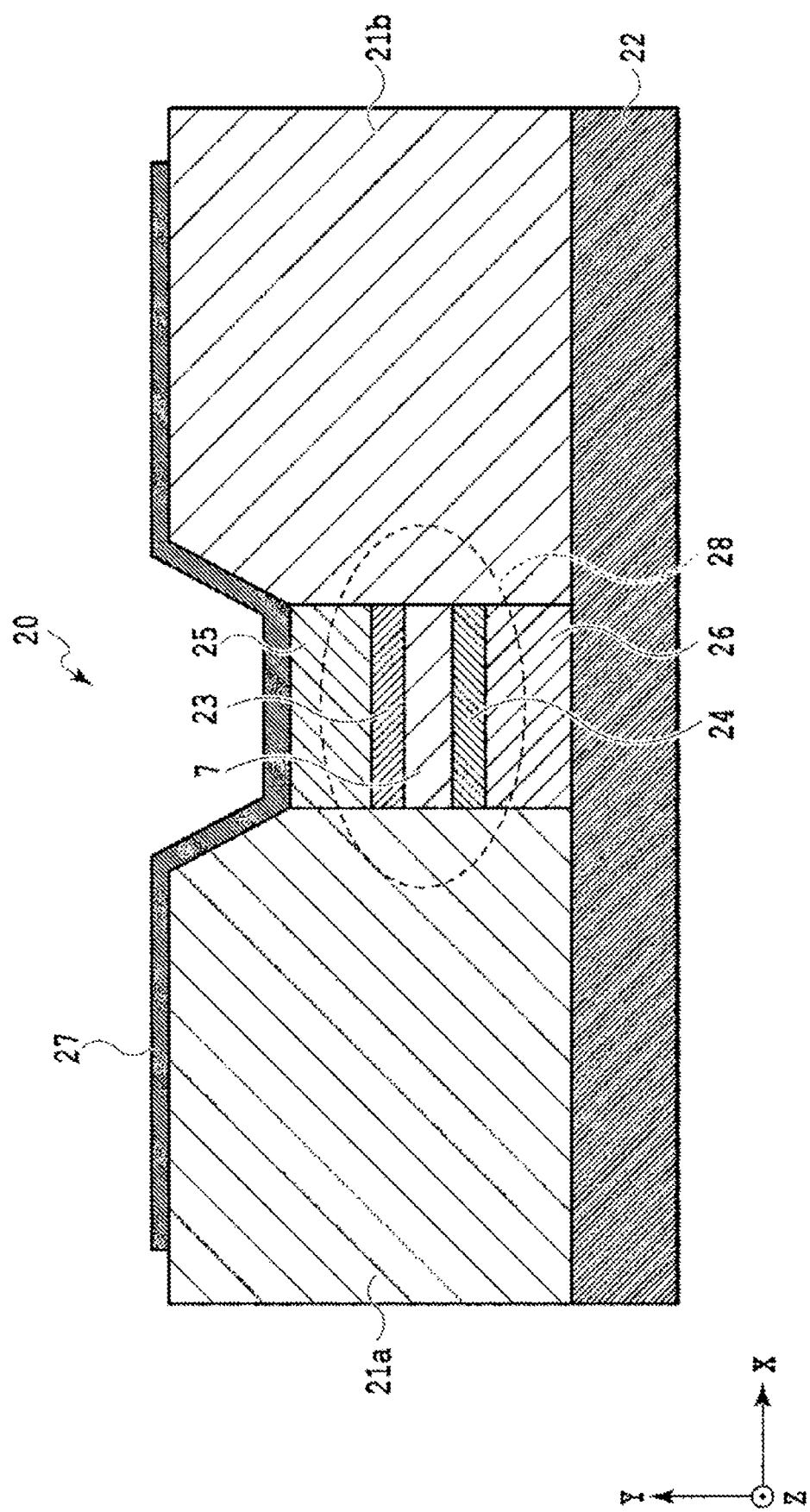
FIG. 5 is a diagram illustrating a cross-sectional configuration perpendicular to an optical waveguide direction of a waveguide in an SOA region.

FIG. 5 is a diagram illustrating a cross-sectional configuration in which a waveguide in the SOA region is cut perpendicular to the optical waveguide direction. Thus, this corresponds to a cross section (Y-X plane) cut along a V-V line in FIG. 2. In an example of the waveguide configuration in the SOA region in the AXEL, a lower cladding layer 26, a lower semi-confinement heterostructure (SCH) layer 24, the active layer 7, an upper SCH layer 23, and an upper cladding layer 25 are sequentially laminated on an n-InP substrate 22. Semi-insulating (SI) InP embedded layers 21a and 21b are formed on both sides of the waveguide. Regions of the active layer 7 and the SCH layers 23 and 24 into which a current (carriers) is injected from an electrode 27 in an uppermost portion have a higher refractive index than other regions, and light is confined in the regions so that the regions function as a core of the waveguide.

On the other hand, because an optical waveguide mode has a continuous distribution function as represented by a Gaussian function, part of the light power exudes to cladding regions on the top, bottom, left and right of the core, as indicated by a dotted line 28 in FIG. 5. A proportion of light power confined in the core is defined as the optical confinement coefficient $\Gamma$ in Equation (1). From this, the inventors obtained an idea of controlling the optical confinement coefficient Γ. As illustrated in FIG. 4, when the light power increases exponentially with the propagation distance and the optical confinement coefficient $\Gamma$ conversely decreases with the increase of the light power, a light power density in the region of the active layer 7, that is, a photon density, can be made uniform.

The inventors thought that controlling a configuration of the SOA so that the optical confinement coefficient Γ decreases with the propagation distance of the light could suppress waveform deterioration caused by carrier depletion due to rapid carrier consumption on the portion near the emission end of the SOA (a second half of the waveguide).

Normally, increasing the carrier density is the most effective method in stably operating the SOA and suppressing the influence of the pattern effect. As illustrated in FIG. 5, the carrier density decreases as the carrier consumption increases in the SOA. Because the carriers are supplied by a current flowing through the SOA and are proportional to an amount of the SOA current, the SOA current is increased in order to suppress the decrease in the carrier density. However, the SOA current has an upper limit due to heat generation or reliability, and carrier supply ultimately cannot keep up in a situation in which carrier consumption is large.

The inventors thought that it would be better to change the viewpoint from the idea of the related art of increasing the carrier density, suppress the amount of carrier consumption to a relatively low level, and make the carrier density uniform. Also referring to FIG. 4, because the pattern effect becomes remarkable in a state in which $P_O$ is increased and the carrier density is considered to be low ("1" level), and an eye pattern waveform deteriorates, it is presumed that it is preferable to suppress carrier consumption in order to suppress the waveform deterioration. Further, the active layer in which stimulated emission that supports amplification action of the SOA occurs has a well-like structure with a narrower band gap than surroundings, and carriers are stored in the active layer. However, because excessively supplied carriers overflow from a well, the carriers only pass through a semiconductor without contributing to the stimulated emission. Such a state is very inefficient for driving of the SOA, and this is not considered realistic from the viewpoint of the heat generation and efficiency described above. Thus, in the SOA, a configuration in which, conversely, the carrier consumption is suppressed so that the carrier density is made uniform is focused on.

In the configuration of the optical transmitter of the present disclosure, a waveguide width in the SOA region integrated in the AXEL is changed so that the amount of carrier consumption is made uniform in the optical waveguide direction (a longitudinal direction of the waveguide). This suppresses the pattern effect. The waveguide width (a mesa width) is continuously reduced in the optical waveguide direction in the SOA so that the optical confinement coefficient is reduced, and light power distributed in an active layer region is made constant even when a total light power increases toward the emission end due to optical amplification in the SOA.

As described above, the pattern effect generated in the SOA is caused by a spatial fluctuation of the carrier density inside the SOA. Normally, because power of light increases with light propagation inside the SOA, the carrier density decreases from an incidence end to an emission end of the SOA. It is difficult for the carrier density inside the SOA to always be kept high in a portion proximate to the emission end of the SOA. Thus, in the optical transmitter of the present disclosure, the SOA waveguide has a tapered structure to use a phenomenon in which the optical confinement is degraded as the waveguide width is decreased. The optical confinement is degraded toward an SOA output end, which originally has a large carrier consumption, and the light power is dispersed from the active region to the cladding region in which there is no carrier consumption. As a result, carrier consumption is made uniform over the entire SOA, and even when a relatively long SOA is adopted, deterioration of optical waveform quality can be suppressed and high output can also be achieved.

In the optical transmitter of the present disclosure to be described below, the waveguide width of the SOA is changed in various aspects along the optical waveguide direction (the longitudinal direction of the waveguide) and control of the optical confinement coefficient Γ is performed. Specifically, the optical transmitter of the present disclosure includes a tapered structure in which the waveguide width is gradually reduced in the optical waveguide direction, that is, toward the emission end in at least a part of the SOA region. In a region in which the waveguide width of the SOA is reduced, an amount of light exuded to the cladding becomes large and the confinement coefficient F also becomes small. Thus, a proportion of the light power distributed in a core region of the waveguide in the SOA is reduced, and carrier consumption in the core region is suppressed. As a result, it is conceivable that the carrier density is kept at a constant level over the entire SOA region, the pattern effect is suppressed, and a good EYE waveform is obtained. Hereinafter, specific examples of the optical transmitter according to the AXEL of the present disclosure will be further described.

Example 1

Figure 6:
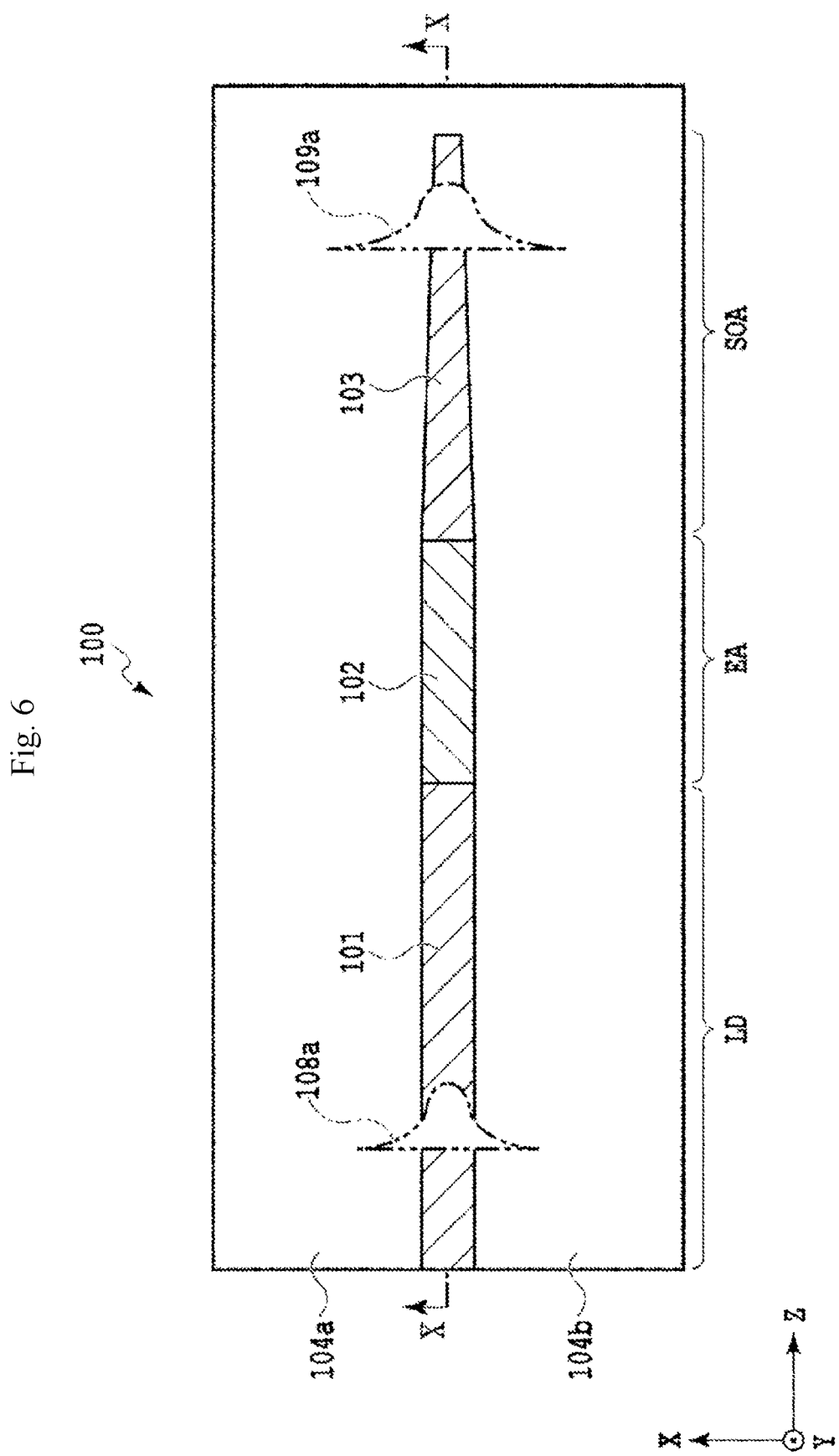
FIG. 6 is a diagram illustrating a configuration of an optical transmitter of Example 1 according to an AXEL of the present disclosure.

FIG. 6 is a diagram illustrating a schematic configuration of the optical transmitter of Example 1 according to the AXEL of the present disclosure. The optical transmitter 100 includes the DFB laser, the EA modulator, and the SOA integrated in this order on a substrate. FIG. 6 illustrates an internal cross section passing through the center of a thickness direction of the optical waveguide, when viewed in a direction perpendicular to a substrate surface (x-z plane). FIG. 6 is a diagram in which elements above the cross section are removed and a cross section of the active layer is viewed from above. The optical transmitter 100 is a monolithically integrated element in which a 300 μm long DFB laser waveguide 101, a 150 μm long EA modulator waveguide 102 in front of the DFB laser waveguide 101, and a 315 μm long SOA waveguide 103 are configured in that order. The above-described basic configuration is the same as that of the optical transmitter according to the AXEL of the related art in FIG. 2. The optical transmitter 100 of the present disclosure has a configuration different from a configuration of the related art (FIG. 11) in that the waveguide width of the waveguide 103 of the SOA gradually changes along a z-axis and has a tapered structure. The waveguide width at the incidence end of the SOA is 1.7 μm, which is the same as that of each waveguide of the DFB laser or the EA modulator. Here, a method for determining the width of the tapered waveguide in the characteristic SOA of the present disclosure will be examined.

Figure 7:
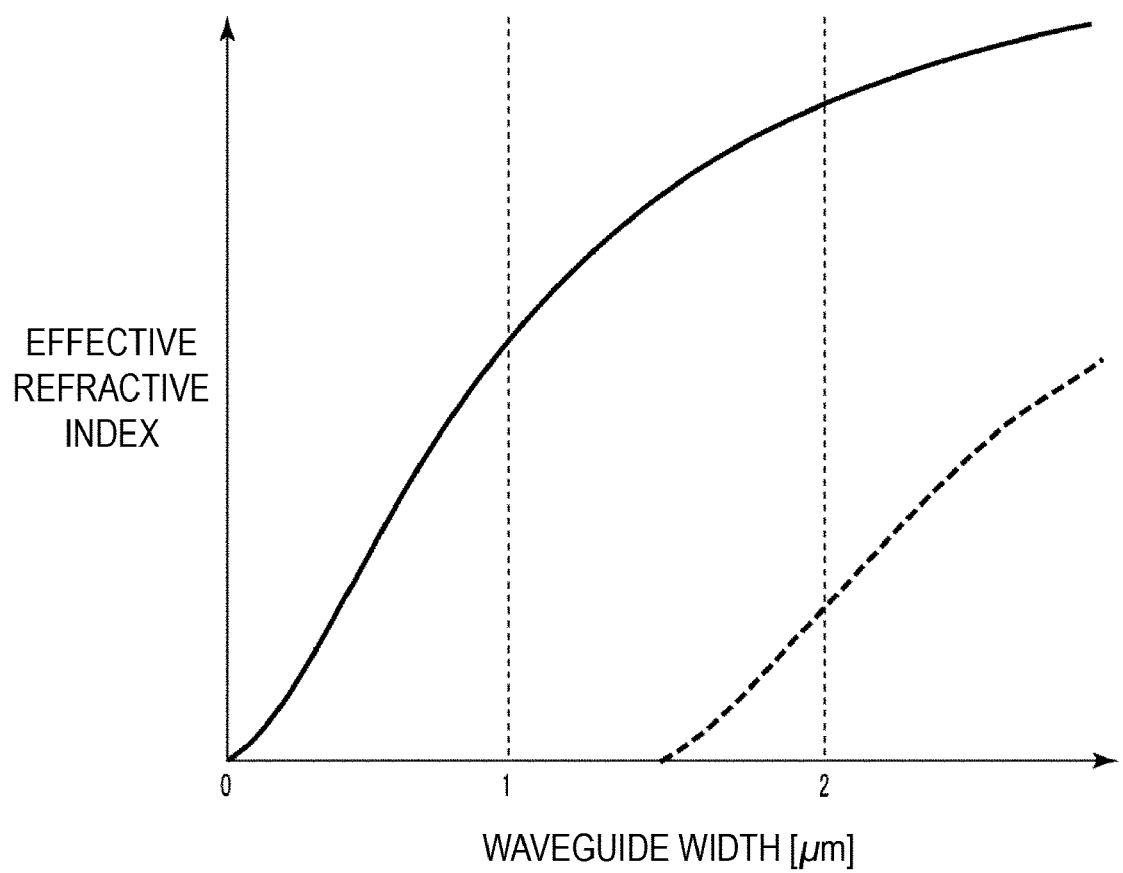
FIG. 7 is a diagram illustrating an effective refractive index of a fundamental mode and a higher-order mode with respect to a waveguide width.

FIG. 7 is a diagram illustrating a change in an effective refractive index between a fundamental mode and a higher-order mode with respect to the waveguide width. In FIG. 7, a horizontal axis indicates the waveguide width (μm), and a vertical axis indicates the effective refractive indexes of the fundamental mode that is a 0th order (a solid line) and the higher-order mode that is a 1st order (dotted line). When the waveguide width is about 1.5 μm, there is a higher-order waveguide mode indicated by a dotted line, and when the waveguide width is 2 μm or more, the optical confinement coefficient of the higher-order mode becomes large and the laser operates in multi-transverse mode. When the oscillating light is in the multi-transverse mode, coupling efficiency between light emitted from the optical transmitter and an external single-mode fiber is degraded. Thus, when a single-transverse mode laser operation is implemented in a wavelength band from an O band to an L band, an upper limit of the waveguide width is typically 2 µm. In the waveguide 103 in the SOA region of the optical transmitter 100 of the present example, the waveguide width decreases continuously and linearly over the entire region of the SOA in the optical waveguide direction. A waveguide width at the incidence end of the SOA was set to 1.7 µm, and a waveguide width at the emission end of the SOA, which is a final portion of the tapered structure, was set to 1.0 µm.

Figure 8:
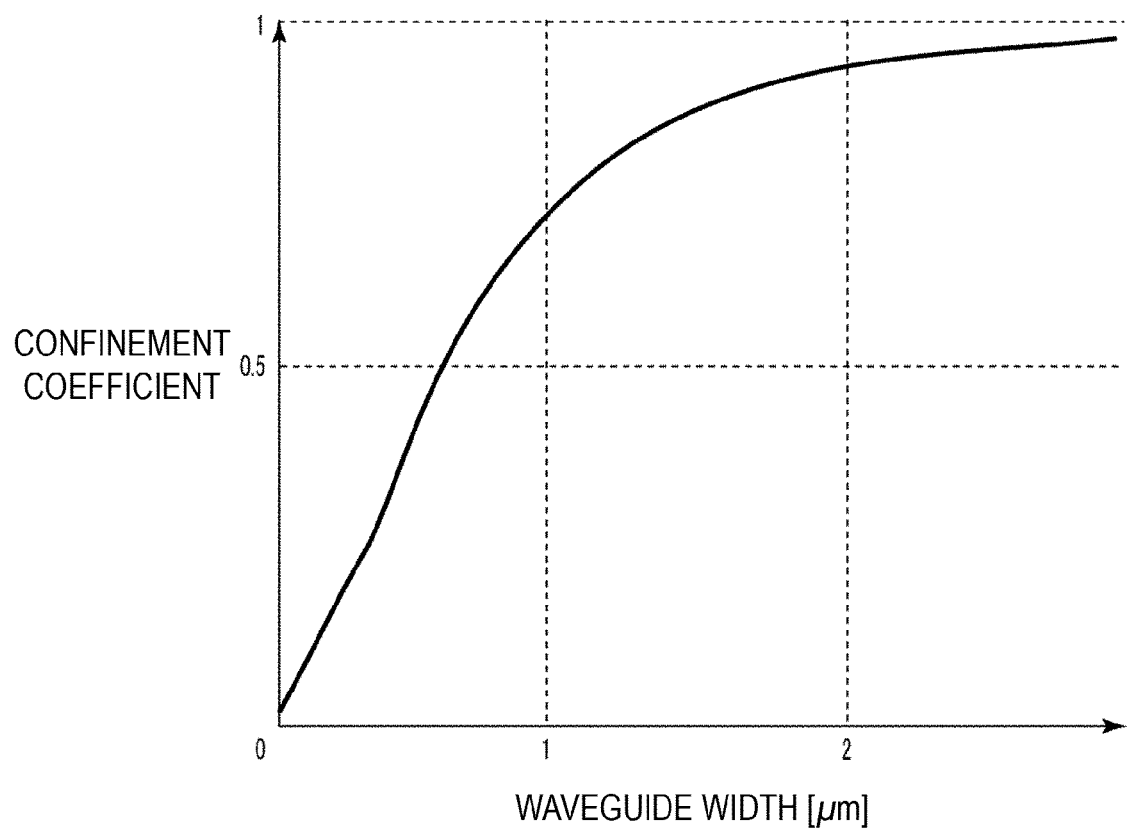
FIG. 8 is a diagram illustrating a change in an optical confinement coefficient with respect to a waveguide width.

FIG. 8 is a diagram illustrating change in the optical confinement coefficient with respect to the waveguide width. A horizontal axis in FIG. 8 indicates the waveguide width (µm), and a vertical axis indicates the optical confinement coefficient. As an example, the optical confinement coefficient was calculated for the waveguide structure illustrated in FIG. 5 with respect to light having a wavelength of 1.55 µm. A thickness of the core layer that confines the light in a vertical direction was calculated as 300 nm. As expressed by Equation (1), when $\Gamma g$ is smaller than a and $(\Gamma g - \alpha) > 0$ is not satisfied, the light is attenuated in the semiconductor. Referring to the optical confinement coefficient of FIG. 8, a lower limit of the practical waveguide width is about 0.8 µm. This is because the gain cannot be obtained in the semiconductor active layer when the waveguide width is too narrow because the gain of the SOA indicated in Equation (1) is determined by a product of the optical confinement coefficient $\Gamma$ and the gain g of the semiconductor active layer. In the present example, in order to obtain a specific optimal tapered shape, as a preliminary experiment, a plurality of single SOAs having the same width in the optical waveguide direction but different waveguide widths were prepared each other, and a relationship between the waveguide width and the output power of the SOA was obtained. For the coupling on the incidence end of the single SOA, a fiber output was coupled by a two-lens system, and the emission end was measured with a large-diameter power meter.

Figure 9:
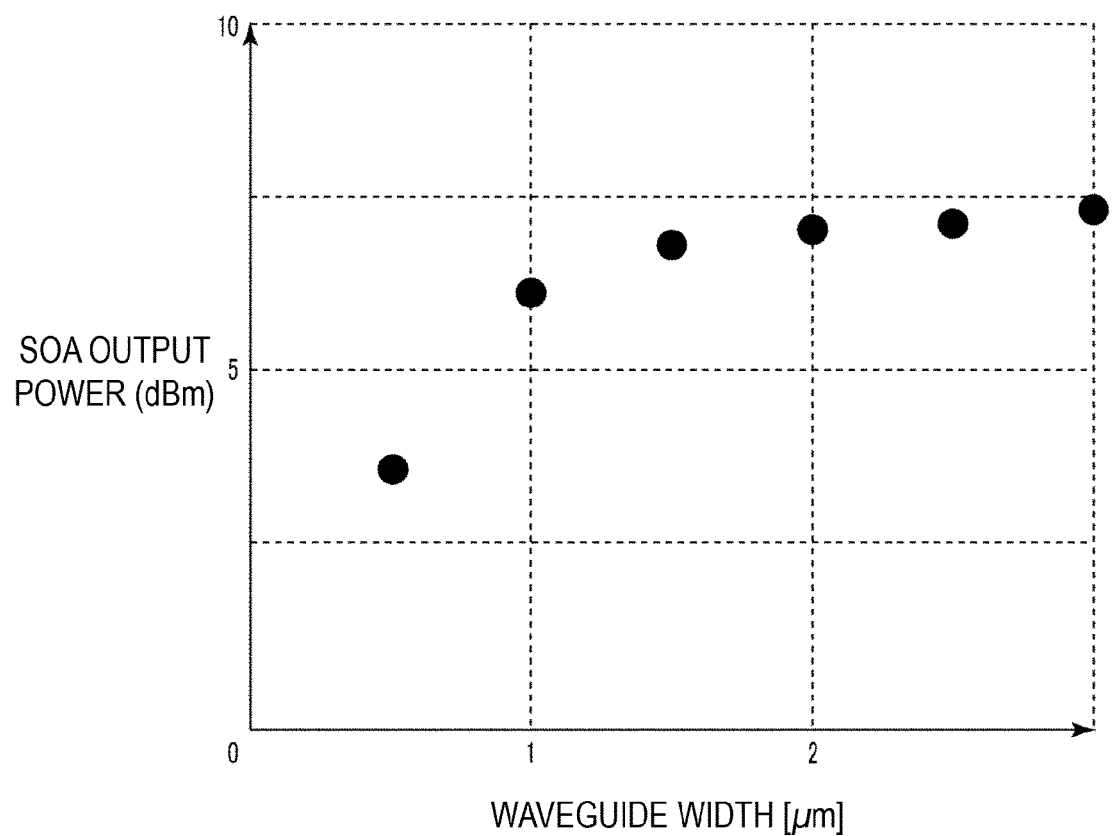
FIG. 9 is a diagram illustrating a relationship between a waveguide width (a constant width) of the SOA and an output power.

FIG. 9 is a diagram illustrating the relationship between the waveguide width (constant width) and the output power of the SOA. A horizontal axis indicates the waveguide width (µm) of the SOA, and a vertical axis indicates the output power (dBm) of the SOA. In this case, the SOA length is 100 µm, an SOA injection current is 50 mA, and an input power to the SOA is 3 dBm. It can be seen from FIG. 9 that amplification performance of the SOA changes rapidly when the waveguide width of the SOA is between 0.5 µm and 1 µm. In a range in which the waveguide width is 0.8 µm or less, the output power is reduced and a sufficient optical amplification operation is not obtained. Regarding a length of the tapered shape of the SOA, because an optical loss occurs in the waveguide mode when the waveguide width is rapidly, it is better to set a rate of change in width of about 1 µm in the optical waveguide direction (longitudinal direction) of the waveguide to 0.02 µm or less. In the optical transmitter of the present example, the waveguide width is limited to a range of 2 µm to 0.8 µm in consideration of practical upper and lower limits of the above-described waveguide width for functioning as an SOA. Assuming that the waveguide width is changed within this range, a length of the tapered structure of the SOA needs to be at least 60 µm or more. Thus, the waveguide (having length of 60 µm or more) of the SOA may be gradually reduced with a maximum change width of 2 µm to 0.8 µm, or the change width may be further reduced and gradually reduced in a range of 1.8 µm to 1.0 µm. A maximum amount of change in the waveguide width may be determined depending on a degree of the pattern effect, which is a target.

In the optical transmitter of the present disclosure, because a tapered structure width of which is gradually reduced in the optical waveguide direction is included in at least a part of the waveguide of the SOA, the waveguide width on the emission end of the SOA is usually smaller than the waveguide width on the incidence end of the SOA. However, because the EA modulator and the SOA can also be connected by a tapered passive waveguide, the waveguide width on the incidence end and the waveguide width on the emission end may be the same.

Here, a process of manufacturing the integrated circuit (AXEL) of the optical transmitter 100 will be described. For element manufacture, an initial substrate in which a lower SCH layer, an active layer (MQW1) of a multi quantum well layer, and an upper SCH layer were sequentially grown on an n-InP substrate was used. Here, the multi quantum well includes six quantum well layers and has an optical gain in an oscillation wavelength of 1.55 µm. The initial substrate including each of the above-described layers has a structure optimized for high-efficiency operation of the DFB laser 101. The initial substrate is used because the initial substrate is widely available, and each of the above-described layers may be manufactured without using the initial substrate.

A process of manufacturing an integrated circuit will be described with reference to FIG. 6 again. First, other active layers are selectively etched, leaving a part including the waveguide 101 of the DFB laser and the waveguide 103 of the SOA region, and a multi quantum well layer (MQW2) for the waveguide 102 of the EA modulator was grown by butt joint regrowth. Subsequently, a diffraction grating was formed in a region of the DFB laser to operate in an oscillation wavelength band of 1.55 µm.

Thereafter, a p-InP cladding layer and a contact layer were grown on the entire surface of the element by regrowth. A thickness of the cladding layer was 2.0 µm in the present example so that a field of the light is not hang over an electrode region. A mesa structure was formed by etching. In this process, any pattern is formed through a photolithography process and a waveguide width of each region is formed through a batch etching process. In the SOA region, a tapered structure in an SOA portion was achieved by continuously reducing a width of the mask. Even when a tapered waveguide is included in the SOA as in the optical transmitter according to the AXEL of the present disclosure, the above-described manufacturing process is the same as that of the related art, and manufacture can be performed without increasing a process load or cost.

Then, Fe-doped semi-insulating InP layers 104a and 104b were formed on both sides of a mesa by embedding and regrowth. Subsequently, the contact layers between the respective regions were removed by wet etching in order to electrically separate the respective regions of the DFB laser, the EA modulator, and the SOA. Thereafter, a P-side electrode for injecting a current through the contact layer on each region of an upper surface of the InP substrate was formed. Further, a back surface of the InP substrate was polished up to about 150 µm, an electrode was formed on the back surface of the substrate, and a process of manufacturing the integrated circuit on a semiconductor wafer is completed.

Although not illustrated in FIG. 6, in each element on the wafer, an anti-reflective coating (AR) is performed on a front end face adjacent to the waveguide 103 of the SOA and highly reflective coating (HR) is performed on a rear end face opposite to the front end face, after an end face from which light is emitted is cut out. A cleavage position on a portion proximate to the emission end of the SOA is set to a position 12.5 µm away from the end of the waveguide 103 of the SOA, so that propagating light is emitted from the waveguide structure of the SOA and propagates in a free space in an embedded InP region. In an actual device, there is an error relevant to accuracy of the cleavage position and a propagation distance in a free space can vary between 2.5 µm and 22.5 µm, but end face reflection is suppressed by the propagation in the free space. In the optical transmitter 100 of the present example, a core layer structure formed in the initial substrate remains as it is in the waveguide 103 of the SOA, and is the same as a layer structure of the waveguide 101 of the DFB laser. The only difference in layer structure between the DFB laser and the SOA is the presence or absence of a diffraction grating. In the optical transmitter 100 of the present example, a common layer structure is used for the DFB laser and the SOA, such that the number of regrowths is suppressed in a structure in which a plurality of functional regions have been integrated, resulting in manufacture at low cost.

Figure 10:
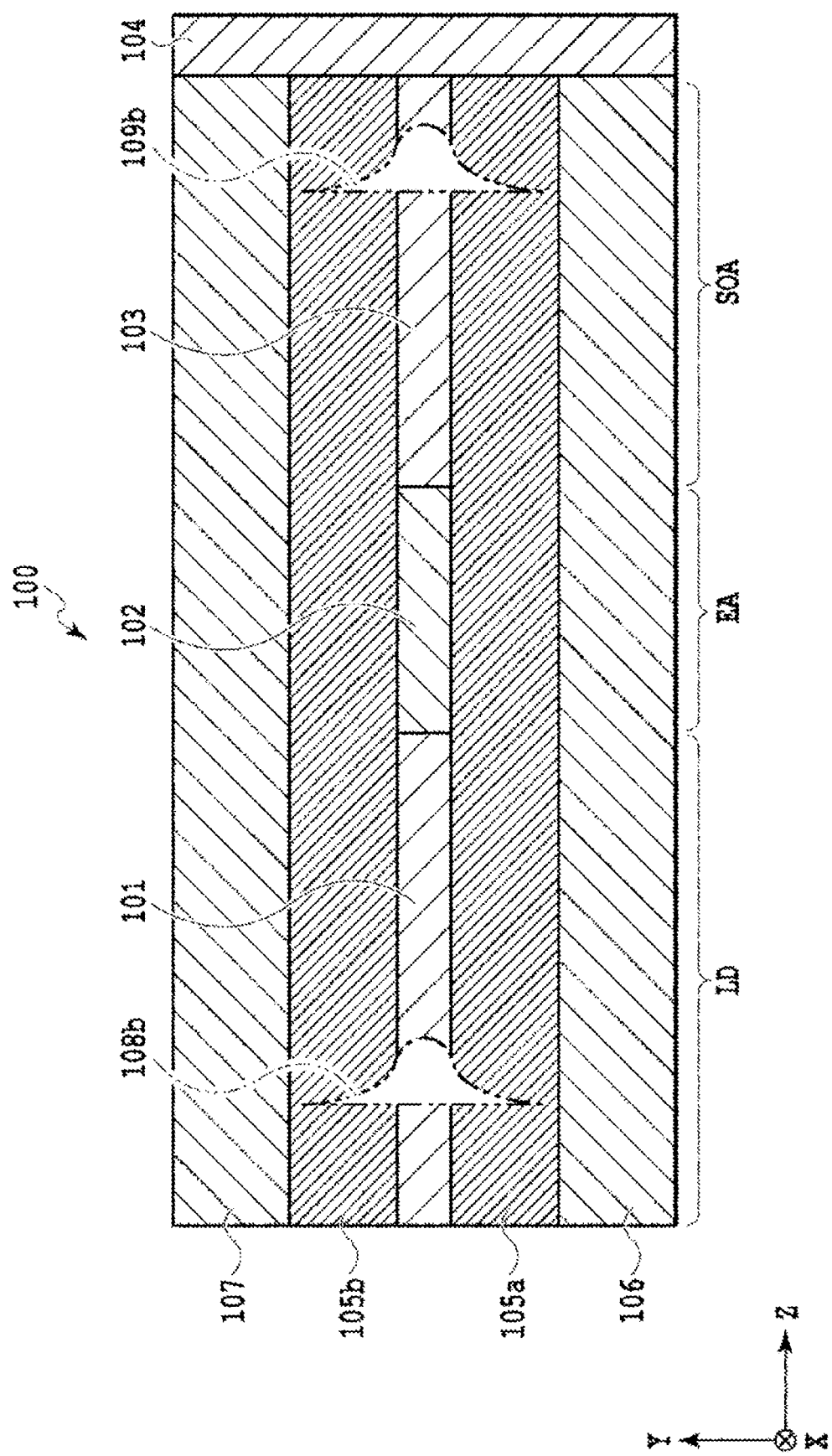
FIG. 10 is a diagram illustrating a configuration of a cross section perpendicular to a substrate of the optical transmitter of Example 1.

FIG. 10 is a diagram illustrating a structure of a cross section perpendicular to a substrate surface of the optical transmitter of Example 1. A cross section (Y-Z plane) perpendicular to a substrate surface (X-Z plane) including a X-X line in FIG. 6 is viewed, but it should be noted that a Y direction indicates an enlarged core layer and others. The optical transmitter 100 of the present example has a laminated structure that includes a core layer (total layer thickness of 200 nm) including active layers 101 to 103 of the multi quantum well layer and upper and lower SCH layers 105a and 105b, and an InP cladding layers 106 and 107 with the core layer vertically sandwiched therebetween in the Y direction. Referring back to FIG. 6, an embedded heterostructure in which the InP layers 104a and 104b have been formed on both sides of the mesa in the X direction is included. The waveguide width (stripe width) in regions other than the SOA was set to 1.7 µm throughout all the regions. Although not illustrated in FIG. 10, the DFB laser operates at a single wavelength determined by a diffraction grating formed in the region of the DFB laser.

In the optical transmitter of the present example, the core layer structure formed in an initial growth substrate remains as it is in the SOA, and is the same structure as the layer structure of the DFB laser. The only difference in layer structure between the DFB laser and the SOA is the presence or absence of the diffraction grating. In the optical transmitter 100 of the present example, a common layer structure is used for the DFB laser and the SOA, such that the number of regrowths is suppressed in a structure in which a plurality of functional regions have been integrated, resulting in manufacture at low cost. An optical transmitter including an SOA having a length of 250 µm and no tapered structure was simultaneously manufactured on the same substrate as the optical transmitter in Example 1, and comparative evaluation was performed with the optical transmitter in Example 1 having the configurations illustrated in FIGS. 6 and 10 to verify an effect of the tapered structure in the SOA.

FIG. 11 is a diagram illustrating a configuration of an optical transmitter of the related art used for comparison with Example 1. This corresponds to a top view of the waveguide in the present example in FIG. 6, and is a diagram illustrating a cross section passing through the centers of a thickness direction of the optical waveguides 5, 6 and 7 of the optical transmitter 20, which is viewed in a direction perpendicular to a substrate surface (x-z) plane. The difference from the configuration of Example 1 in FIG. 6 is that the waveguide 7 of the SOA is not tapered and has a uniform width (the same width).

FIGS. 6, 10 and 11 schematically show a light power distribution in the DFB laser and a light power distribution in the SOA, respectively. In the configuration of the related art of FIG. 11, two light power distributions 11 and 12 have the same spread in an X-axis direction. On the other hand, in FIG. 6 of the configuration of the present example, it should be noted that a light power distribution 109a of the waveguide of the SOA having the tapered structure has spread toward a portion proximate to the cladding (X-axis direction) as compared with a light power distribution 108a of the waveguide of the DFB laser. This is because, in the SOA, the gradual reduction of the waveguide width decreases the optical confinement coefficient F. Because there is no change in thickness of the waveguide in a direction perpendicular to the substrate surface (Y-axis direction) in FIG. 10, two light power distributions 108b and 109b have the same spread. Modulation characteristics of 10 Gbit/s were evaluated using a manufactured element. As a modulation signal, a pseudo-random binary sequence $PRBS2^{31}-1$ in NRZ format was used. In all the manufactured AXELs, a current value of the DFB laser was set to 80 mA, a voltage applied to the EA modulator was set to ~1.5 V, and a current value of the SOA was set to 100 mA. An amplitude voltage Vpp of a signal applied to the EA changer was 1.5 V. SOAs having no tapered structure manufactured for comparison are each designed so that a volume per unit length of an active layer is the same as that of an SOA having a tapered structure. Thus, carrier densities obtained from all current values when the same current value is injected into the SOA in a state in which there is no input of the signal light are the same.

When an optical output at the time of modulation was evaluated by fiber coupling using a standard single-mode fiber with a lens, the optical output at the time of modulation was 11.5 mW for the optical transmitter of the present example having the tapered structure in the SOA. On the other hand, in the case of an optical transmitter of the related art having no tapered structure, the optical output at the time of modulation was 12.2 mW. A difference between both was about 0.25 dB, and even when the waveguide of the SOA had the tapered structure, a decrease in the optical output was substantially not observed, and the optical output substantially the same as that of the optical transmitter of the related art was obtained.

Figure 12:
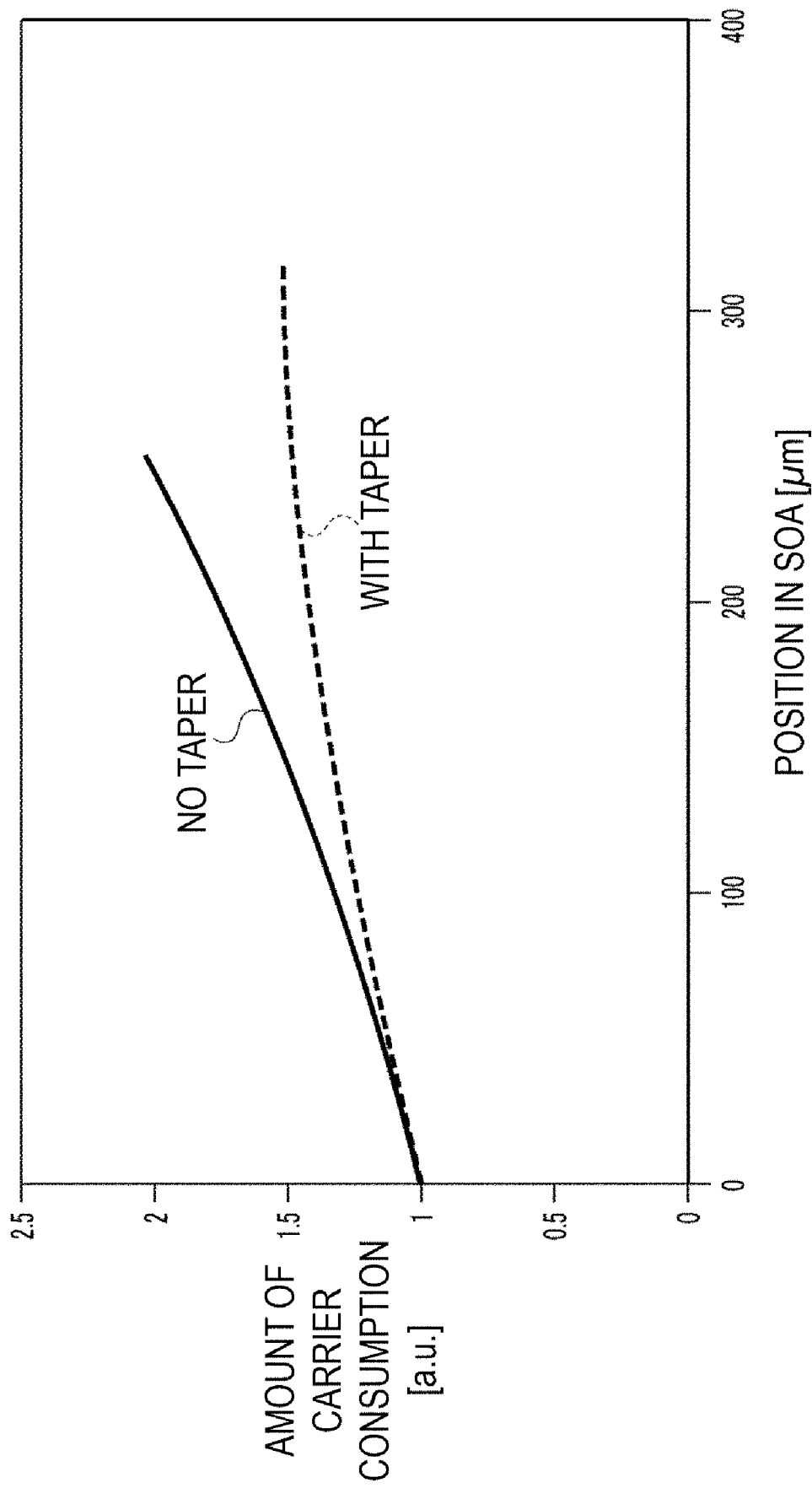
FIG. 12 is a diagram illustrating a carrier consumption distribution inside the SOA in the configuration of Example 1.

FIG. 12 is a diagram illustrating a distribution of the amount of carrier consumption inside the SOA. A horizontal axis indicates a position from an incidence end in the SOA, that is, a propagation distance (µm), and a vertical axis indicates the amount of carrier consumption (AU) obtained by numerical calculation. In the SOA having no tapered structure, when the amount of carrier consumption at the SOA incidence end is 1, more than twice carriers are consumed at the emission end of the SOA as shown by a calculation result indicated by a solid line. This corresponds to the fact that the light intensity increases toward the emission end of the SOA and more carriers are consumed as a light propagation distance (SOA length) L increases, as illustrated in FIG. 4.

On the other hand, in the configuration of the optical transmitter of the present example including the SOA waveguide having a tapered structure, it can be seen that an increase in the amount of carrier consumption can be suppressed up to about 1.5 times at maximum, as shown in a calculation result indicated by a dotted line. That is, because the waveguide width of the SOA is gradually reduced in the optical waveguide direction by the tapered structure of the SOA, the amount of carrier consumption in the active region of the SOA is suppressed and the amount of carrier consumption is made uniform toward the SOA emission end. Thus, a suppressed influence of the pattern effect can be expected.

FIG. 13 is a diagram illustrating improvement of the eye pattern in the optical transmitter in Example 1. FIG. 13(a) illustrates an eye pattern of the optical transmitter 100 including the SOA having the tapered structure of the present example. FIG. 13(b) illustrates an eye pattern in the case of an optical transmitter including an SOA having no tapered structure in the related art. As is clear from FIG. 13(a), in the SOA having the tapered structure, a variation width of the "1" level is reduced, a clear opening (eye) is obtained, and the waveform quality of the eye pattern is greatly improved. When transmission characteristics of 40 km were evaluated using the same conditions, error-free transmission was confirmed in the optical transmitter including the SOA having the tapered structure, but error-free could not be reached in the case of the SOA having no tapered structure.

As described above in FIGS. 12 and 13, the tapered structure is included in the SOA waveguide so that the amount of carrier consumption is controlled, and thus, deterioration of the optical signal waveform quality due to the pattern effect has been suppressed, and an effect of improvement to sufficient optical waveform quality having a clear eye pattern has been confirmed.

Example 2

In Example 1 described above, the tapered structure is included in the waveguide of the SOA, but a shape of the taper has a width that is linearly reduced over the entire region of the SOA along the optical waveguide direction (longitudinal direction) of the SOA. However, the configuration is not limited to the waveguide configuration of Example 1 as long as the configuration is a structure in which the waveguide width is reduced toward the emission end of the SOA so that the amount of carrier consumption near the emission end of the SOA can be suppressed. In the present example, a configuration example in which the tapered structure is included only in a part of a portion proximate to the emission end of the second half of the waveguide instead of the entire region of the SOA is illustrated.

Figure 14:
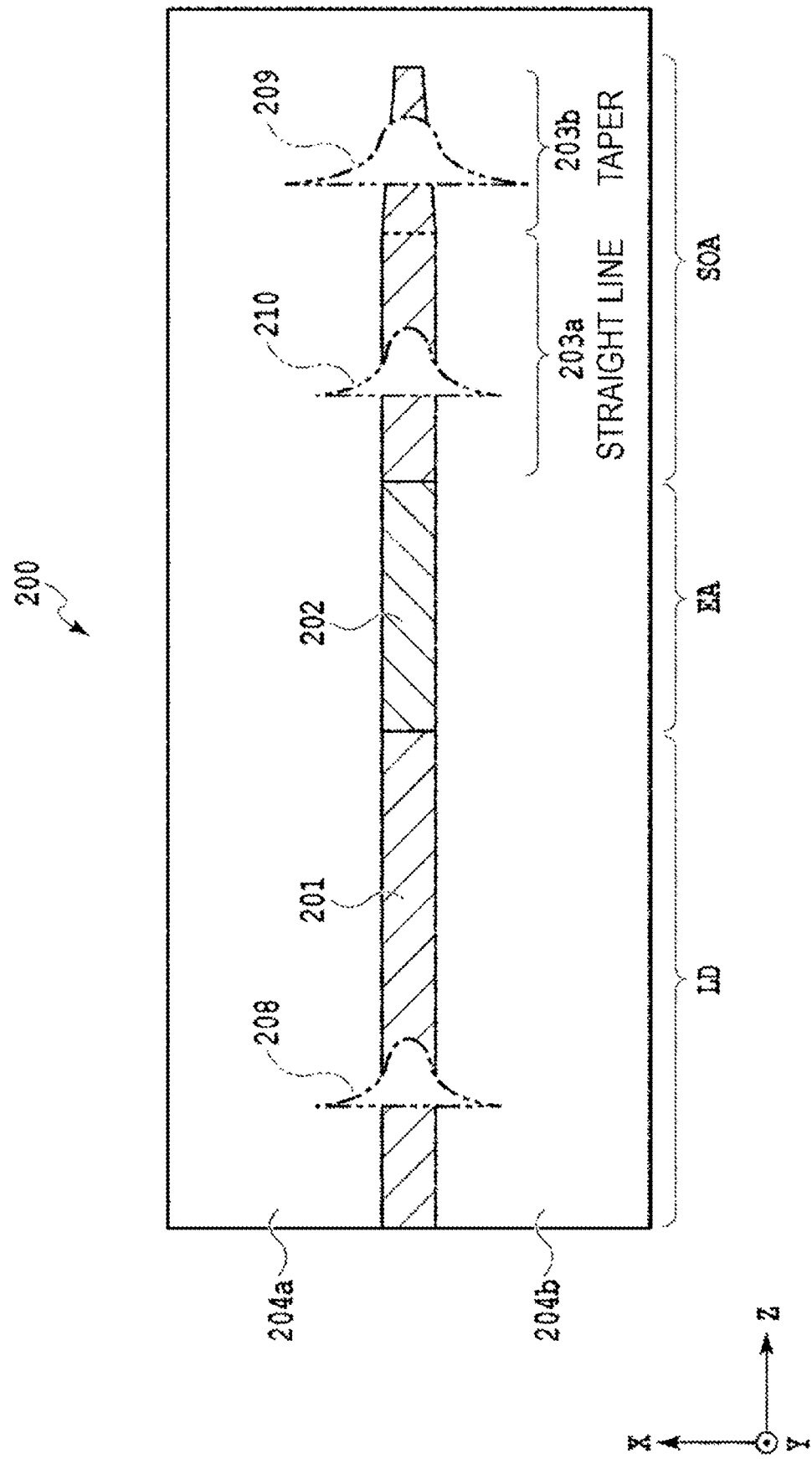
FIG. 14 is a diagram illustrating a configuration of an optical transmitter of Example 2 according to an AXEL of the present disclosure.

FIG. 14 is a diagram illustrating a configuration of the optical transmitter of Example 2 according to the AXEL of the present disclosure. As in FIG. 6 of Example 1, in the optical transmitter 200, the DFB laser, the EA modulator, and the SOA are integrated in this order on the substrate, and FIG. 14 is a diagram illustrating a cross section of the inside passing through the center of a thickness direction of the optical waveguide when viewed in a direction perpendicular to a substrate surface (x-z plane). A diagram in which elements above the cross section are removed and a cross section of the active layer is viewed from above is illustrated. A waveguide 201 of the DFB laser (LD) has a length of 300 µm, a waveguide of the EA modulator in front of the DFB laser in the optical waveguide direction has a length of 150 µm, waveguides 203a and 203b of the SOA have a total length of 310 µm, and the waveguides are monolithically integrated. Semi-insulating InP layers 204a and 204b due to embedding and regrowth are illustrated on both sides of the waveguide. A difference in configuration from the optical transmitter of Example 1 is that a first half of the SOA is 100 µm in length and is the linear waveguide 203a having no taper and having the same width, and a second half of the SOA is 210 µm in length and is the tapered structure 203b the waveguide width of which is linearly reduced. A waveguide width at a start point of the tapered shape is 1.7 µm, and a waveguide width at an end point of the tapered shape is 0.8 µm.

In the present example, it should be noted that a light power distribution 209 of the waveguide 203b having the tapered structure of the SOA is wider in the X-axis direction than the light power distributions 208 and 210 of the constant-width waveguides 201 and 203a having the same waveguide width in the DFB laser and the first half of the SOA.

As illustrated in a relationship between the light propagation distance and the light intensity in the SOA of FIG. 4, the light power inside the SOA increases rapidly in a second half of the waveguide in a portion proximate to the emission end. Thus, the effect of suppressing the amount of carrier consumption due to the tapered structure of the first half of the waveguide of the SOA should not remarkable as compared with the case in which the second half has a tapered structure. Thus, in the present example, in order to improve a gain in the first half of the SOA waveguide and aim for higher output, a structure is such that the tapered shape is introduced from the middle of the waveguide instead of the start point of the SOA waveguide. For driving conditions of the SOA, a current value of the laser was set to 80 mA, a voltage applied to the EA modulator was set to −1.5 V, and the current value of the SOA was set to 100 mA. The amplitude voltage Vpp of the signal applied to the EA modulator was 1.5 V.

When an optical output of the optical transmitter of Example 2 at the time of modulation was evaluated by fiber coupling using a single-mode fiber with a lens, 12 mW was obtained. The output power was slightly improved as compared with the 11.5 mW of the optical transmitter of Example 1 in which the entire region of the SOA had the tapered structure. Regarding an effect of suppressing carrier consumption, the same level as in the case of Example 1 can be expected.

Figure 15:
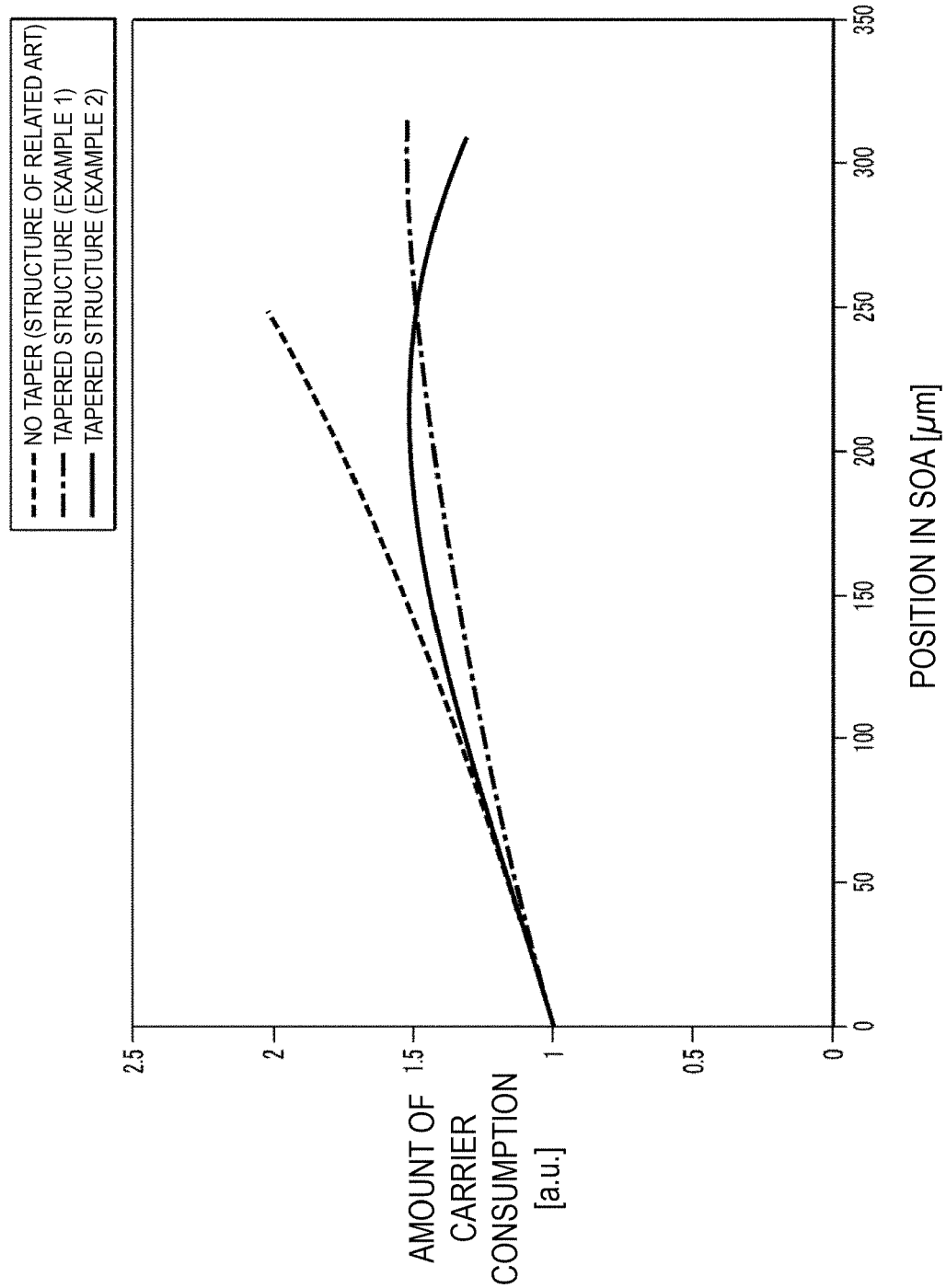
FIG. 15 is a diagram illustrating a carrier consumption distribution inside the SOA in the configuration of Example 2.

FIG. 15 is a diagram illustrating a distribution of the amount of carrier consumption inside the SOA. Exactly as in FIG. 13, a horizontal axis indicates a position (µm) from the incidence end in the SOA, and a vertical axis indicates the amount of carrier consumption (AU) obtained by numerical calculation. A calculation result for a structure in which only the second half of the waveguide of the SOA of the present example is tapered is added to the two curves of the related art and Example 1 illustrated in FIG. 13. In a curve of the amount of carrier consumption of the present example indicated by a solid line, it can be confirmed that the effect of suppressing the amount of carrier consumption becomes strong when the propagation distance becomes larger than 200 µm. An amount of increase in carrier consumption with reference to the incidence end of the SOA can also be suppressed to about 1.5 times at maximum, as in Example 1.

A process of manufacturing the optical transmitter of the present example is substantially the same as that of Example 1 described above, except that only the mask pattern of the SOA differs from that of Example 1. An oscillation wavelength of the DFB laser in the present example is a 1.55 µm band that operates at a single wavelength determined by the diffraction grating. Modulation characteristics of 10 Gbit/s were evaluated using a manufactured element. As a modulation signal, a pseudo-random binary sequence PRBS2$^{31}$-1 was used, as in Example 1.

Figure 16:
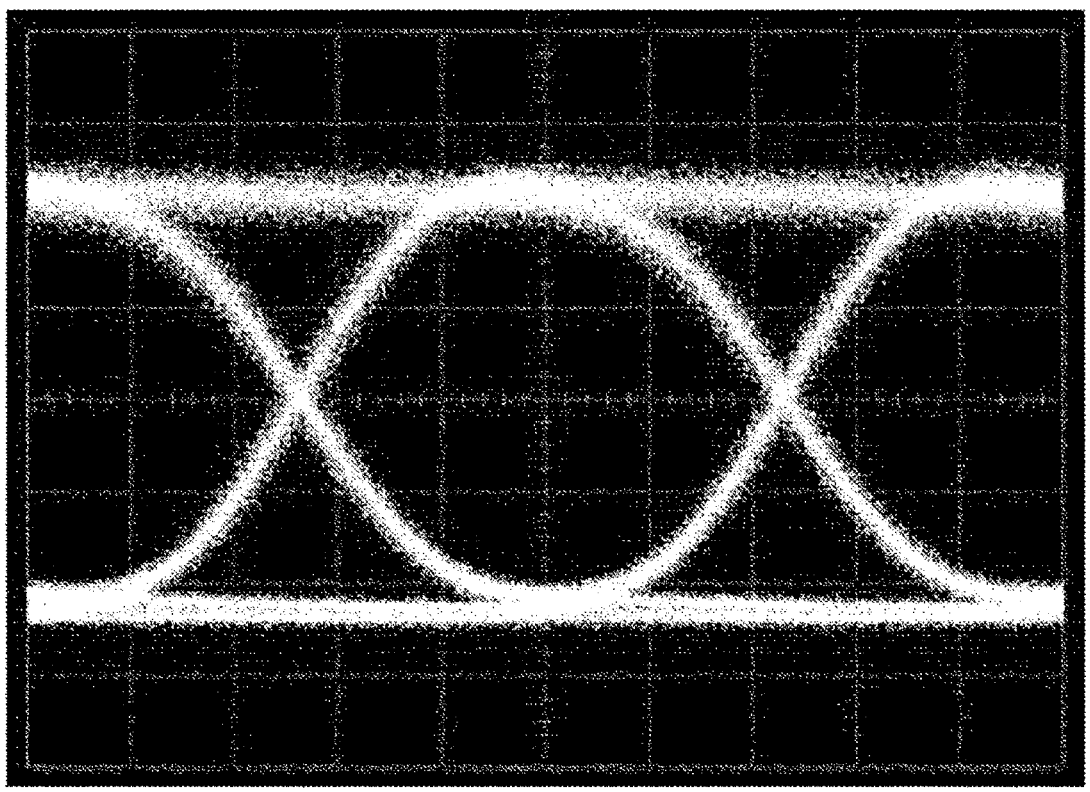
FIG. 16 is a diagram illustrating an eye pattern in the optical transmitter of Example 2.

FIG. 16 is a diagram illustrating an eye pattern in the optical transmitter of Example 2. Overshoot of a "1" level left in the case of Example 1 illustrated in FIG. 13(a) could hardly be confirmed in the waveform of Example 2 of FIG. 16, and a better eye pattern waveform was obtained. In the optical transmitter of Example 2, a good eye pattern with a clear eye opening is achieved even though a total length of the SOA is as very long as 310 μm. It was shown that, even when the tapered structure is introduced from the middle of the SOA waveguide as in the present example, the pattern effect can be suppressed and a very high optical output and a high-quality optical waveform can be obtained.

Example 3

In Example 1, a configuration in which the entire region of the SOA had the tapered structure and the waveguide width is gradually reduced along the optical waveguide direction (longitudinal direction) is adopted. In Example 2, a modification example in which the tapered structure is included only in the second half of the SOA in a portion proximate to the emission end is indicated. In the present example, a further modification example of the tapered structure in the waveguide of the SOA is indicated, and a configuration example in which the tapered structure is included only in the intermediate portion of the SOA in the optical waveguide direction is indicated.

Figure 17:
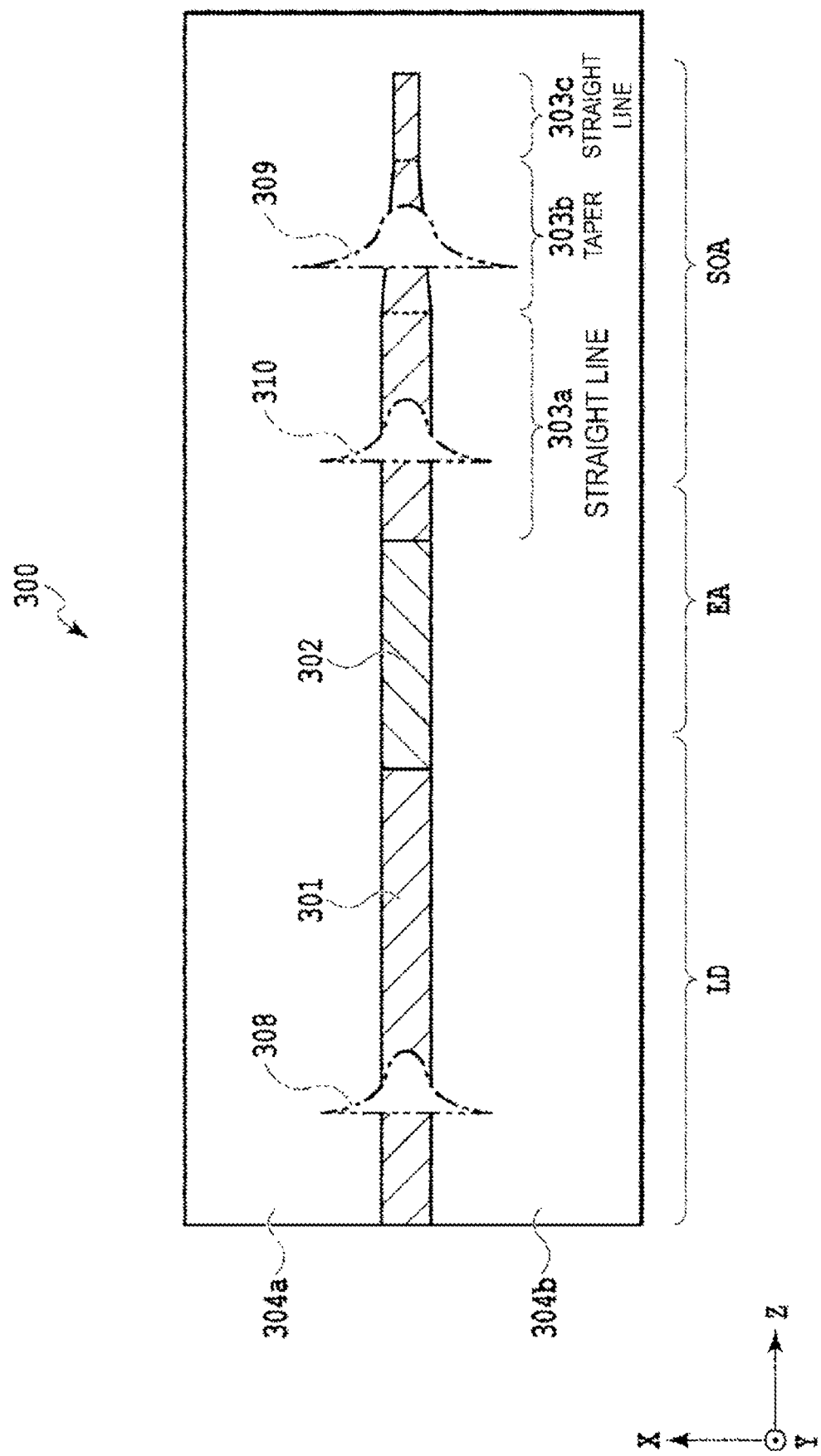
FIG. 17 is a diagram illustrating a configuration of an optical transmitter of Example 3 according to an AXEL of the present disclosure.

FIG. 17 is a diagram illustrating a configuration of the optical transmitter of Example 3 according to the AXEL of the present disclosure. As in Example 1 and Example 2, in an optical transmitter 300, a DFB laser, an EA modulator, and an SOA are integrated in this order on a substrate, and FIG. 17 is a diagram illustrating a cross section of the inside passing through the center of a thickness direction of the optical waveguide when viewed in a direction perpendicular to a substrate surface (x-z plane). A diagram in which elements above the cross section are removed and a cross section of the active layer is viewed from above is illustrated. A waveguide 301 of the DFB laser (LD) has a length of 300 μm, a waveguide 302 of the EA modulator in front of the DFB laser in the optical waveguide direction has a length of 150 μm, waveguides 303a to 303c of the SOA have a total length of 310 μm, and the waveguides are monolithically integrated. Semi-insulating InP layers 304a and 304b due to embedding and regrowth are illustrated on both sides of the waveguide.

A difference in configuration of the optical transmitter between Example 1 and Example 2 is that the waveguide of the SOA includes three regions including a tapered structure in an intermediate portion in the optical waveguide direction. A length of a front portion of the SOA of 100 μm and a length of a rear portion of the SOA of 30 μm form straight waveguides 303a and 303c having the same width and no tapered structure, and a length of 180 μm in an intermediate portion between the waveguides 303a and 303c forms a tapered waveguide 303b in which the waveguide width is linearly reduced. A waveguide width at a start point of a tapered shape is 1.7 μm, and a waveguide width at an end point of the tapered shape is 1 μm. Thus, a width of the constant-width waveguide 303c after the tapered waveguide 303b is also 1 μm.

Referring back to the distribution of carrier consumption in FIG. 15, in the SOA tapered structure in the optical transmitter of Example 2, the carrier consumption begins to decrease when the distance from the incidence end of the SOA is around 220 μm. This is because the tapered structure 203b in the second half reduces the optical confinement coefficient Γ of the active layer. Because an optical amplification effect of the SOA is also weakened in a state in which the optical confinement coefficient Γ is reduced, high output is hindered. Thus, in the present example, in order to prevent a decrease in amplification gain at an end portion of the waveguide of the SOA, the tapered structure is stopped in the middle of the SOA.

Also in the present example, it should be noted that the light power distribution 309 of the waveguide 303b having a tapered structure of the SOA is wider in the X-axis direction than the light power distributions 308 and 310 of the constant-width waveguides 301 and 303a having the same waveguide width in the DFB laser and the first half of the SOA.

For driving conditions of the optical transmitter of the present example, the current value of the laser was set to 80 mA, a voltage applied to the EA modulator was set to ~1.5 V, and the SOA current value was set to 100 mA. The amplitude voltage Vpp of the signal applied to the EA modulator was 1.5 V.

When the optical output of the optical transmitter of Example 3 at the time of modulation was evaluated by fiber coupling using a single-mode fiber with a lens, 13 mW was obtained. Although a difference from the related art, Example 1, and Example 2 is small, the highest optical output was obtained with the optical transmitter of the present example. Regarding the effect of suppressing carrier consumption, the same level as in the cases of Example 1 and Example 2 can be expected.

Figure 18:
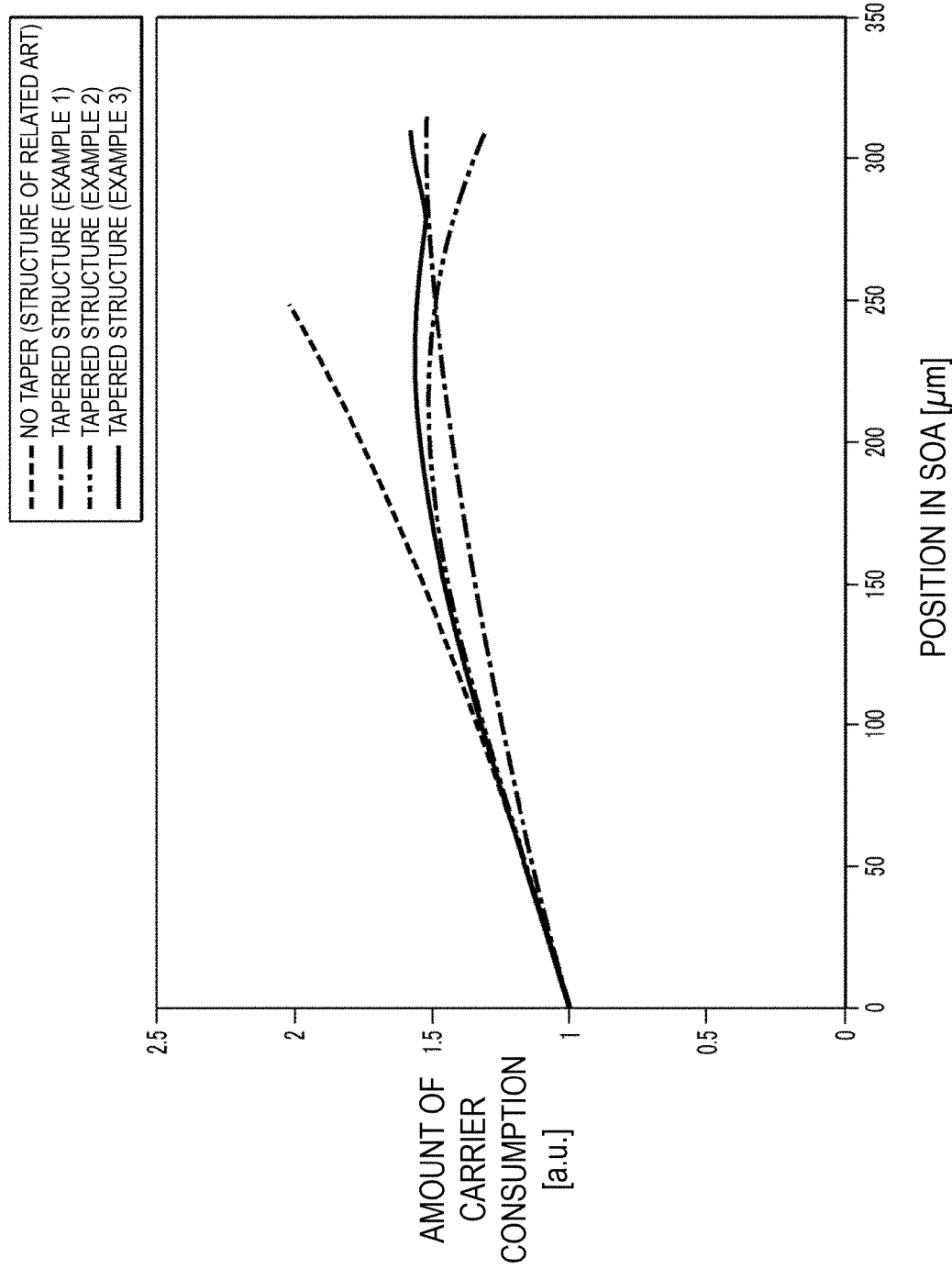
FIG. 18 is a diagram illustrating a carrier consumption distribution inside an SOA in various waveguide configurations.

FIG. 18 is a diagram illustrating a distribution of the amount of carrier consumption inside the SOA in various SOA waveguide configurations described above. A horizontal axis indicates a position (μm) from the incidence end in the SOA, and a vertical axis indicates the amount of carrier consumption (AU) obtained by numerical calculation, as in FIGS. 13 and 15. In FIG. 18, a calculation result for a structure in which only an intermediate portion of the SOA of the present example is tapered is added to the three curves of the related art, Example 1, and Example 2. The increase in the amount of carrier consumption due to the configuration of Example 3 indicated by a solid line can be suppressed to the same extent as in Example 1 and Example 2. The amount of increase in the amount of carrier consumption with reference to the incidence end is also suppressed to about 1.5 times at maximum as in Example 1. It can also be seen that the decrease in the amount of carrier consumption in a rear part of the SOA (from 220 μm) viewed in the configuration of Example 2 (dashed line) is also improved.

A manufacturing process of the optical transmitter of the present example is substantially the same as that of Example 1 and Example 2 described above. An oscillation wavelength of the DFB laser in the present example is a 1.55 μm band that operates at a single wavelength determined by the diffraction grating. Modulation characteristics of 10 Gbit/s were evaluated using a manufactured element. As the modulation signal, a pseudo-random binary sequence PRBS2$^{31}$-1 was used, as in Example 1 and Example 2.

Figure 19:
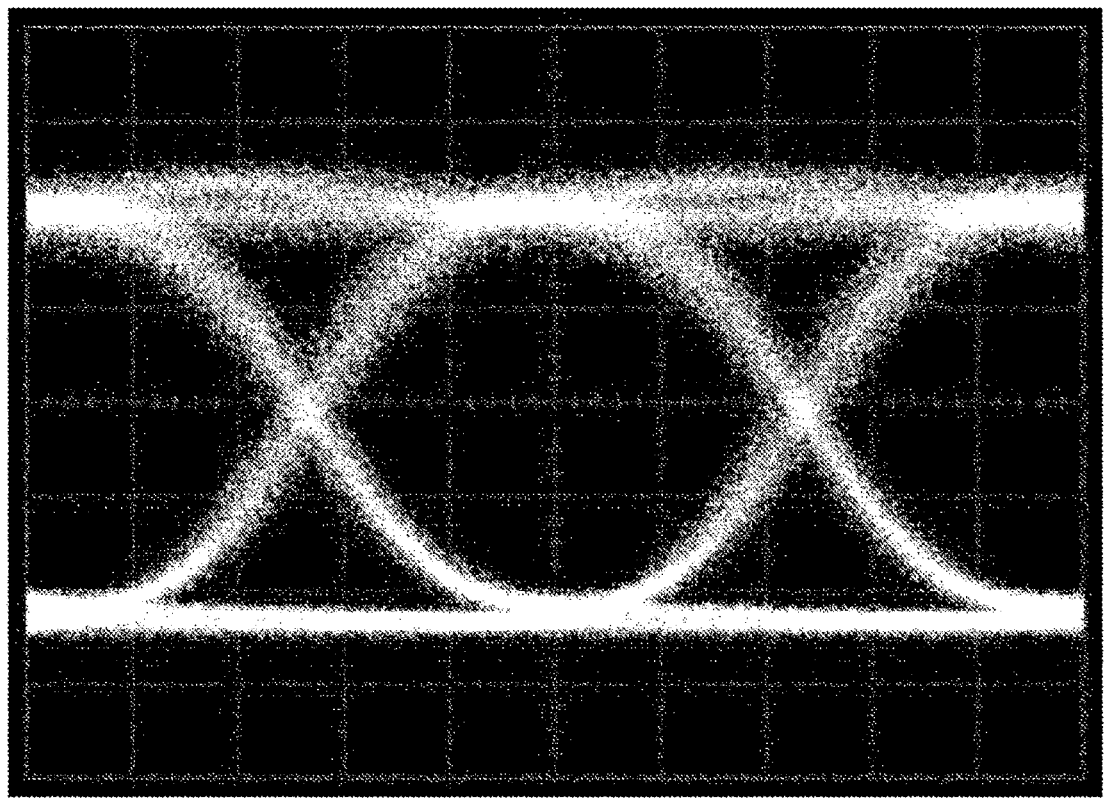
FIG. 19 is a diagram illustrating an eye pattern in the optical transmitter of Example 3.

FIG. 19 is a diagram illustrating an eye pattern in the optical transmitter of Example 3. Overshoot of a "1" level left in the case of Example 1 illustrated in FIG. 13(a) could hardly be confirmed in Example 3 of FIG. 19, and a better eye pattern waveform was obtained. As illustrated in FIG. 18, because the amount of carrier consumption is suppressed to the same extent as that of Example 2 in the optical transmitter of the present example, the eye pattern has a good waveform very close to that of Example 2. It can be seen that, also in the optical transmitter of the present example, a good eye pattern with a clear eye opening is achieved even though a total length of the SOA is as very long as 310 μm.

It was shown that, even when the tapered structure is started from the middle of the waveguide of the SOA and ended in the middle of the waveguide of the SOA as in the present example, the pattern effect is suppressed and a very high optical output and a high-quality optical waveform can be obtained.

As described in detail above, with the optical transmitter of the present disclosure, in the AXEL in which the SOA has monolithically integrated, it is possible to suppress the deterioration of the optical waveform quality while using the same manufacturing process as that for the EADFB laser, resulting in high optical output and a high-quality optical waveform. An effect of making the carrier density uniform using the tapered structure provided in the SOA is not limited to the application to only the wavelength band indicated in each example, but can also be applied to an optical communication band such as 1250 to 1600 μm.

INDUSTRIAL APPLICABILITY

The present invention can be used for optical communication. For example, the present invention can be used for optical transmitters.

The invention claimed is:

1. An optical transmitter comprising, on a substrate,
a distributed feedback (DFB) laser having an active region with a multi quantum well,
an electro-absorption (EA) modulator configured to modulate oscillation light of the DFB laser, and
a semiconductor optical amplifier (SOA) having an active region with an identical composition as the active region of the DFB laser and configured to increase light power of signal light from the EA modulator,
wherein at least a part of a waveguide of the SOA has a tapered structure where a width of the waveguide in a cross section perpendicular to an optical waveguide direction is gradually reduced along the optical waveguide direction, such that an optical confinement coefficient decreases in accordance with the power of the signal light.

2. The optical transmitter according to claim 1, wherein the DFB laser, the EA modulator, and the SOA are monolithically integrated on the substrate, and optical waveguide structures of the DFB laser and the SOA are an identical layer structure.

3. The optical transmitter according to claim 1, wherein an entire region of the SOA has the tapered structure.

4. The optical transmitter according to claim 1, wherein the tapered structure is included in an intermediate portion of the SOA in the optical waveguide direction, and a portion between an incidence end of the SOA and a start point of the tapered structure and a portion between an end point of the tapered structure and an emission end of the SOA are constant-width waveguides, respectively.

5. The optical transmitter according to claim 1, wherein the tapered structure is included in a portion including an emission end of the SOA, and a portion between a start point of the tapered structure and an end of the SOA facing the EA modulator is an constant-width waveguide.

6. The optical transmitter according to claim 1, wherein the tapered structure is characterized in that the width of the waveguide is reduced linearly and monotonically.

7. The optical transmitter according to claim 1, wherein the tapered structure is characterized in that the width of the waveguide is gradually reduced in any range between 0.8 μm and 2.1 μm.

8. The optical transmitter according to claim 1, wherein the width of the waveguide of the SOA differs between an incidence end and an emission end.

* * * * *